(12) United States Patent
Guo et al.

(10) Patent No.: US 12,163,035 B2
(45) Date of Patent: Dec. 10, 2024

(54) WHITE INKJET INK

(71) Applicant: Hewlett-Packard Development Company, L.P., Spring, TX (US)

(72) Inventors: Dennis Z. Guo, San Diego, CA (US); Jie Zheng, San Diego, CA (US); Barbara Casanas Montes, Corvallis, OR (US); Marcos A. Barreto Caban, Aguadilla, PR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 99 days.

(21) Appl. No.: 18/015,287

(22) PCT Filed: Jul. 17, 2020

(86) PCT No.: PCT/US2020/042527
§ 371 (c)(1),
(2) Date: Jan. 9, 2023

(87) PCT Pub. No.: WO2022/015323
PCT Pub. Date: Jan. 20, 2022

(65) Prior Publication Data
US 2023/0265303 A1    Aug. 24, 2023

(51) Int. Cl.
*C09D 11/322* (2014.01)
*D06P 5/30* (2006.01)
*C09D 11/54* (2014.01)

(52) U.S. Cl.
CPC .............. *C09D 11/322* (2013.01); *D06P 5/30* (2013.01); *C09D 11/54* (2013.01)

(58) Field of Classification Search
CPC ... C09D 11/102; C09D 11/107; C09D 11/322; C09D 11/326; C09D 11/54; D06P 1/44; D06P 1/5257; D06P 1/5271; D06P 1/5285; D06P 1/613; D06P 5/30
See application file for complete search history.

(56) References Cited

U.S. PATENT DOCUMENTS

| | | |
|---|---|---|
| 7,842,757 B2 | 11/2010 | Roy et al. |
| 10,167,406 B2 | 1/2019 | Bruinsma et al. |
| 10,465,085 B2 * | 11/2019 | Kasperchik ............... C09C 3/10 |
| 11,305,557 B2 * | 4/2022 | Bi ........................ B41M 5/0023 |
| 2003/0105201 A1 | 6/2003 | Auschra et al. |
| 2007/0060670 A1 | 3/2007 | Ellis |
| 2009/0030139 A1 | 1/2009 | Roy et al. |
| 2010/0105807 A1 | 4/2010 | Sugita et al. |
| 2010/0160498 A1 | 6/2010 | Aarni et al. |
| 2017/0362456 A1 | 12/2017 | Bruinsma et al. |
| 2022/0186060 A1* | 6/2022 | Guo ..................... B41M 5/0023 |

FOREIGN PATENT DOCUMENTS

| | | |
|---|---|---|
| CN | 111116842 A | 5/2020 |
| WO | 2020/046341 A1 | 3/2020 |

* cited by examiner

*Primary Examiner* — Anh T Vo
(74) *Attorney, Agent, or Firm* — Dierker & Kavanaugh, P.C.

(57) ABSTRACT

An example of a white inkjet ink includes: a non-self-dispersed white pigment; from about 0.005 wt % to about 1 wt %, based on a total weight of the white inkjet ink, of an anionic copolymer dispersant having a weight average molecular weight (Mw) ranging from about 125,000 g/mol to about 30,000,000 g/mol; a polymeric binder; and an aqueous vehicle. The white inkjet ink may be used in a textile printing kit.

15 Claims, 6 Drawing Sheets

WHITE INKJET INK

BACKGROUND

Textile printing methods often include rotary and/or flat-screen printing. Traditional analog printing typically involves the creation of a plate or a screen, i.e., an actual physical image from which ink is transferred to the textile. Both rotary and flat screen printing have great volume throughput capacity, but also have limitations on the maximum image size that can be printed. For large images, pattern repeats are used. Conversely, digital inkjet printing enables greater flexibility in the printing process, where images of any desirable size can be printed immediately from an electronic image without pattern repeats. Inkjet printers are gaining acceptance for digital textile printing. Inkjet printing is a non-impact printing method that utilizes electronic signals to control and direct droplets or a stream of ink to be deposited on media.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
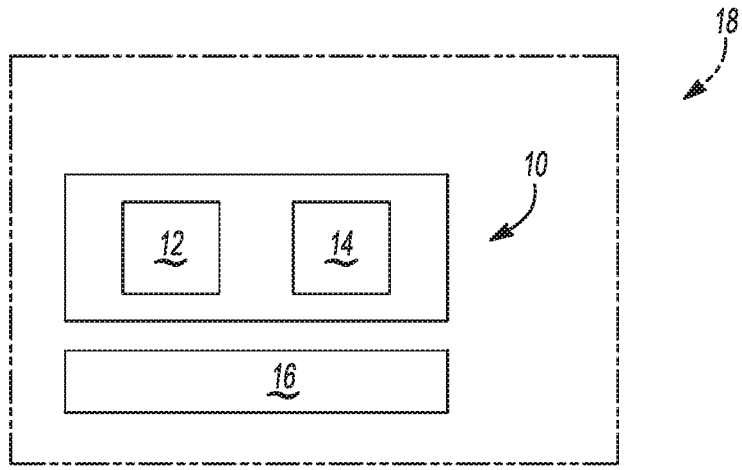
FIG. 1 schematically illustrates an example fluid set and an example textile printing kit, each of which includes an example of a fixer composition and an example of a white inkjet ink.

The textile market is a major industry, and printing on textiles, such as cotton, etc., has been evolving to include digital printing methods. However, the vast majority of textile printing (95%) is still performed by analog methods, such as screen printing. Multi-color printing with analog screen printing involves the use of a separate screen for each color that is to be included in the print, and each color is applied separately (with its corresponding screen). In contrast, digital inkjet printing can generate many colors by mixing basic colors in desired locations on the textile, and thus avoids the limitations of analog screen printing.

However, there are certain challenges involved with inkjet printing white ink formulations. White ink formulations may be made with titanium dioxide pigment, which has a large average particle size, low viscosity, and high density. These properties may lead to an increased sedimentation rate, where the ink formulation separates from the pigment and the pigment settles to form sediment. The compact sediment may be difficult to re-disperse, which can lead to clogging of the printhead nozzles, pigment depletion, and/or pigment enrichment. Pigment enrichment occurs when the pigment concentration is not evenly distributed in the ink, and has a higher concentration at or near the nozzle. The resulting images are darker or more opaque at the portion printed first, and then become lighter or less opaque at the portion printed later.

Disclosed herein is a white inkjet ink that is easily re-dispersed after storage, and that is particularly suitable for digital thermal or piezoelectric inkjet printing. The white inkjet ink disclosed herein includes a non-self-dispersed white pigment, an anionic copolymer dispersant, a polymeric binder, and an aqueous vehicle. The present inventors have found that a relatively small amount (e.g., up to about 1 wt % active) of the anionic copolymer dispersant may be used to help re-disperse the white pigment (that has settled during idling) of the white inkjet ink, without including a rheology modifier. As such, example inks as disclosed herein do not include a rheology modifier while yet exhibiting good re-dispersibility. As used herein, the terms "re-dispersible" and "redispersibility" mean that after the white inkjet ink has been exposed to a period of storage, brief mixing, re-circulation, or shaking substantially uniformly disperses the pigment solids (including those that may have settled) throughout the ink vehicle. In some examples, centrifugation was used to accelerate the pigment settlement process so that the redispersibility could be measured within hours when the ink became available instead of waiting for weeks for the white pigment to settle naturally. In one example, at least 82% of the pigment solids of an example white inkjet ink which has been settled via centrifugation are re-dispersed after the white inkjet ink is exposed to 60 seconds of mixing, re-circulation, or shaking.

With improved re-dispersibility, the aforementioned defects of clogged printhead nozzles, pigment depletion, and/or pigment enrichment are minimized, and in some instances, prevented. Improved re-dispersibility can also speed up printing, in part because the time spent re-dispersing the stored ink is reduced and the maintenance time for servicing clogged printhead nozzles is reduced or eliminated. Moreover, with such a small amount of anionic copolymer dispersant, the solids content of the white ink is not significantly increased, and the white inkjet ink is readily jettable via a thermal inkjet printhead.

The white inkjet ink disclosed is also suitable for printing on a variety of textile fabrics, including cotton and cotton blends, as well as dark colored fabrics. The formulation generates white images with desirable opacity and washfastness.

As mentioned, the white ink formulation exhibits improved re-dispersibility after storage, as well as good jettability, and generates white images with desirable opacity and durability.

Pigment re-dispersibility may be measured with a sediment recovery test. This test is used to accelerate pigment sedimentation by centrifugation, followed by remixing of the centrifuged sample. Pigment recovery is based on the UV-vis absorbance measured before centrifugation and after centrifugation and remixing. A higher pigment recovery indicates better re-dispersion of the pigment in the ink.

Jettability/pen performance may be measured through a "Turn-On Energy" (TOE) curve. The term "Turn-On Energy (TOE)" curve, as used herein, refers to the drop weight (in nanograms) of an inkjet ink as a function of firing energy (in microJoules). An inkjet ink with good jettability performance also has a good TOE curve, where the ink drop weight rapidly increases (with increased firing energy) to reach a designed drop weight for the pen architecture used; and then a steady drop weight is maintained when the firing energy exceeds the TOE. In other words, a sharp TOE curve may be correlated with good jettability performance. In contrast, an inkjet ink with a poor TOE curve may show a slow increase in drop weight (with increased firing energy) and/or may never reach the designed drop weight for the pen architecture. A poor TOE curve may be correlated with poor jettability performance.

Jettability/pen performance may also be measured through drop weight frequency response. A drop weight frequency response graph illustrates the effect of increasing firing frequency (kHz, X axis) on ink drop weight (ng, Y axis) for inkjet ink compositions. An ink that shows a good frequency response may be correlated with good jettability performance.

The opacity may be measured in terms of $L^*$, i.e., lightness, of the white print generated with the ink formulation disclosed herein on a colored textile fabric. A greater $L^*$ value indicates a greater opacity of the white ink on the colored textile fabric. $L^*$ is measured in the CIELAB color space, and may be measured using any suitable color measurement instrument (such as those available from Hunter-Lab or X-Rite). The inkjet ink, when printed on the colored textile fabric pretreated with the fixer composition disclosed herein, may generate prints that have a desirable $L^*$ value.

The durability of a print on a fabric may be assessed by its ability to retain color after being exposed to washing. This is also known as washfastness. Washfastness can be measured in terms of a change in $L^*$ before and after washing.

The compositions and/or white inkjet ink disclosed herein may include different components with different acid numbers. As used herein, the term "acid number" refers to the mass of potassium hydroxide (KOH) in milligrams that is used to neutralize one (1) gram of a particular substance. The test for determining the acid number of a particular substance may vary, depending on the substance. For example, to determine the acid number of a polyurethane-based binder, a known amount of a sample of the binder may be dispersed in water and the aqueous dispersion may be titrated with a polyelectrolyte titrant of a known concentration. In this example, a current detector for colloidal charge measurement may be used. An example of a current detector is the Mutek PCD-05 Smart Particle Charge Detector (available from BTG). The current detector measures colloidal substances in an aqueous sample by detecting the streaming potential as the sample is titrated with the polyelectrolyte titrant to the point of zero charge. An example of a suitable polyelectrolyte titrant is poly(diallyldimethylammonium chloride) (i.e., PolyDADMAC). It is to be understood that any suitable test for a particular component may be used.

If the counter ion of the acidic groups in a polymer is a metal ion such as, e.g., lithium, sodium, potassium, or others, the acid number of a polymer can be calculated based on the amount of metal counter ion in the polymer. Metal content can be quantified by various analytical methods, including Inductively Coupled Plasma-Optical Emission Spectrometry (ICP-OES).

Throughout this disclosure, a weight percentage that is referred to as "wt % active" refers to the loading of an active component of a dispersion or other formulation that is present in the white inkjet ink or the fixer composition. For example, the white pigment may be present in a water-based formulation (e.g., a stock solution or dispersion) before being incorporated into the white inkjet ink. In this example, the wt % actives of the white pigment accounts for the loading (as a weight percent) of the white pigment that is present in the white inkjet ink, and does not account for the weight of the other components (e.g., water, etc.) that are present in the formulation with the white pigment. The term "wt %," without the term actives, refers to either i) the loading (in the inkjet ink or the fixer composition) of a 100% active component that does not include other non-active components therein, or the loading (in the white inkjet ink or the fixer composition) of a material or component that is used "as is" and thus the wt % accounts for both active and non-active components.

White Inkjet Ink

Examples of the white inkjet ink formulation disclosed herein will now be described. As mentioned above, the white inkjet ink exhibits desirable pigment re-dispersibility and jettability. As also mentioned above, the white inkjet ink, when inkjet printed on a pre-treated black or other non-white textile fabric, may generate prints that have a desirable $L^*$ value, as well as washfastness.

In some examples, the white inkjet ink for textile printing comprises: a non-self-dispersed white pigment; from about 0.005 wt % active to about 1 wt % active, based on a total weight of the white inkjet ink, of an anionic copolymer dispersant having a weight average molecular weight (Mw) ranging from about 125,000 g/mol to about 30,000,000 g/mol; a polymeric binder; and an aqueous vehicle. It is to be understood that as used herein, the unit for weight average molecular weight (Mw) is g/mol or Daltons, even if such unit is not stated after the Mw value. In some of these examples, the white inkjet ink consists of these components with no other components. In these examples, the aqueous vehicle consists of water and a water soluble or water miscible organic co-solvent. In other examples, the white inkjet ink may include additional components. For example, the white inkjet ink may include the non-self-dispersed white pigment, the anionic copolymer dispersant, the polymeric binder, one or more additives, and the aqueous vehicle. In one example, the white inkjet ink consists of the non-self-dispersed white pigment; the anionic copolymer dispersant; a polyurethane-based binder; the aqueous vehicle; and an additive selected from the group consisting of an anti-decel agent, a surfactant, an anti-microbial agent, and combinations thereof.

Examples of the white inkjet ink disclosed herein may be used in a thermal inkjet printer or in a piezoelectric printer to print on a (pre-treated) textile fabric. When used in a thermal inkjet printer, the viscosity of the white inkjet ink (after being re-dispersed) may range from about 1 cP to about 9 cP (at 20° C. to 25° C.). When used in a piezoelectric printer, the viscosity of the white inkjet ink (after being re-dispersed) may range from about 2 cP to about 20 cP (at 20° C. to 25° C.), depending on the type of the printhead that is being used (e.g., low viscosity printheads, medium viscosity printheads, or high viscosity printheads).

White Pigment Dispersion

The non-self-dispersed white pigment may be incorporated into the inkjet ink as a white pigment dispersion. By non-self-dispersed, it is meant that the white pigment has not been modified to chemically incorporate surface groups or a polymeric dispersant that disperses the pigment. Rather, a separate pigment dispersant (e.g., the anionic copolymer dispersant) is included to disperse the white pigment.

For the white pigment dispersions disclosed herein, it is to be understood that the non-self-dispersed white pigment (prior to being incorporated into the ink formulation), may be dispersed in water alone or in combination with an additional water soluble or water miscible co-solvent, such as 2-pyrrolidone, 1-(2-hydroxyethyl)-2-pyrrolidone, glycerol, 2-methyl-1,3-propanediol, 1,2-butane diol, diethylene glycol, triethylene glycol, tetraethylene glycol, or a combination thereof. It is to be understood however, that the liquid components of the white pigment dispersion become part of the aqueous vehicle in the white inkjet ink.

White Pigments

Examples of suitable non-self-dispersed white pigments include white metal oxide pigments, such as titanium dioxide ($TiO_2$), zinc oxide (ZnO), zirconium dioxide ($ZrO_2$), or the like. In one example, the white pigment is titanium dioxide. In an example, the titanium dioxide is in its rutile form.

In some examples, the non-self-dispersed white pigment may include white metal oxide pigment particles coated with silicon dioxide ($SiO_2$). In one example, the white metal oxide pigment content to silicon dioxide content can be from 100:3.5 to 5:1 by weight. In other examples, the white pigment may include white metal oxide pigment particles coated with silicon dioxide ($SiO_2$) and aluminum oxide ($Al_2O_3$). In one example, the white metal oxide pigment content to total silicon dioxide and aluminum oxide content can be from 50:3 to 4:1 by weight. One example of the white pigment includes TI-PURE® R960 (TiO2 pigment powder with 5.5 wt % silica and 3.3 wt % alumina (based on pigment content)) available from Chemours. Another example of the white pigment includes TI-PURE® TS-6300 ($TiO_2$ pigment powder with 9 wt % silica and 5.8 wt % alumina (based on pigment content)) available from Chemours. Yet another example of the white pigment includes TI-PURE® R931 ($TiO_2$ pigment powder with 10.2 wt % silica and 6.4 wt % alumina (based on pigment content)) available from Chemours. Still another example of the white pigment includes TI-PURE® R706 ($TiO_2$ pigment powder with 3.0 wt % silica and 2.5 wt % alumina (based on pigment content)) available from Chemours.

The non-self-dispersed white pigment may have high light scattering capabilities, and the average particle size of the white pigment may be selected to enhance light scattering and lower transmittance, thus increasing opacity. The average particle size of the non-self-dispersed white pigment may range anywhere from about 10 nm to about 2000 nm. In some examples, the average particle size ranges from about 120 nm to about 2000 nm, from about 150 nm to about 1000 nm, from about 150 nm to about 750 nm, or from about 200 nm to about 500 nm. Smaller particles may be desirable depending upon the jetting architecture that is used. The term "average particle size", as used herein, may refer to a volume-weighted mean diameter of a particle distribution.

The amount of the non-self-dispersed white pigment in the dispersion may range from about 20 wt % to about 60 wt %, based on the total weight of the dispersion. The white pigment dispersion may then be incorporated into the ink vehicle so that the non-self-dispersed white pigment is present in an active amount that is suitable for the inkjet printing architecture that is to be used. In an example, the white pigment dispersion is incorporated into the ink vehicle so that the non-self-dispersed white pigment is present in an amount ranging from about 2 wt % active to about 20 wt % active, based on a total weight of the white inkjet ink. In other examples, the white pigment dispersion is incorporated into the ink vehicle so that the non-self-dispersed white pigment is present in an amount ranging from about 5 wt % active to about 20 wt % active, or from about 5 wt % active to about 15 wt % active, based on a total weight of the white inkjet ink. In still another example, the white pigment dispersion is incorporated into the ink vehicle so that the non-self-dispersed white pigment is present in an amount of about 10 wt % active, based on a total weight of the white inkjet ink.

Comparative Pigment Dispersants (Used in Comparative Inks)

In the comparative (not example) inks discussed herein, the non-self-dispersed white pigment is dispersed with a comparative pigment dispersant. The comparative pigment dispersant is selected from the group consisting of a water-soluble acrylic acid polymer, a branched co-polymer of a comb-type structure with polyether pendant chains and acidic anchor groups attached to a backbone, and a combination thereof.

Some examples of the water-soluble acrylic acid polymer include CARBOSPERSE® K7028 (polyacrylic acid having a weight average molecular weight (Mw) of about 2,300), available from Lubrizol Corporation. Another example is JONCRYL® 683 (poly(styrene acrylic) copolymer having an acid number of about 165 mg KOH/g and a weight average molecular weight (Mw) of about 8,000), available from BASF Corporation. Another example is COADIS® BR 40, (polyacrylic acid), available from Coatex S.A. Corporation.

An example of the branched co-polymer of the comb-type structure with polyether pendant chains and acidic anchor groups attached to the backbone include DISPERBYK®-190 (having an acid number of about 10 mg KOH/g and a weight average molecular weight (Mw) of about 74,100), available from BYK Additives and Instruments.

The amount of the comparative pigment dispersant in the dispersion may range from about 0.1 wt % to about 6 wt %, based on the weight of the white pigment. The white pigment dispersion may then be incorporated into the ink vehicle so that the comparative pigment dispersant is present in an amount ranging from about 0.005 wt % active to about 1 wt % active, based on a total weight of the white inkjet ink. In one of these examples, the comparative dispersant is present in an amount of about 0.0275 wt % active, based on a total weight of the white inkjet ink.

In some examples, the comparative pigment dispersant includes both the water-soluble acrylic acid polymer and the branched co-polymer of the comb-type structure with polyether pendant chains and acidic anchor groups attached to the backbone. In some of these examples, the comparative pigment dispersant includes CARBOSPERSE® K7028 and DISPERBYK®-190, where the water-soluble acrylic acid polymer is present in an amount ranging from about 0.02 wt % active to about 0.4 wt % active, and the branched co-polymer of the comb-type structure with polyether pendant chains and acidic anchor groups attached to the backbone is present in an amount ranging from about 0.03 wt % active to about 0.6 wt % active. In one of these examples, the water-soluble acrylic acid polymer is present in an amount of about 0.05 wt % active, and the branched co-polymer of the comb-type structure with polyether pendant chains and acidic anchor groups attached to the backbone is present in an amount of about 0.08 wt % active.

Anionic Copolymer Dispersant

The white inkjet ink also includes the anionic copolymer dispersant. The anionic copolymer dispersant is a pigment dispersant that has been found to improve the re-dispersibility of any settled white pigment in the white inkjet ink, when compared to the comparative dispersants discussed above. In the examples disclosed herein, the anionic copolymer dispersant is the sole pigment dispersant in the white inkjet ink. In other words, no other pigment dispersants are included.

In some examples, the anionic copolymer dispersant has a weight average molecular weight (Mw) ranging from about 125,000 g/mol to about 30,000,000 g/mol; or from about 200,000 g/mol to about 20,000,000 g/mol; or from about 500,000 g/mol to about 10,000,000 g/mol. In one example, the anionic copolymer dispersant has a weight average molecular weight (Mw) of about 17,000,000 g/mol. It is to be understood that dispersant compounds having such high molecular weights may generally not be seen as suitable for inkjet inks, as their use may have led to concerns with regard to potentially deleteriously affecting the jettability of the inkjet ink.

However, the present inventors have surprisingly found that use of examples of the anionic copolymer dispersant (having very high weight average molecular weights) in the example white inkjet inks herein show better ink re-dispersibility than comparative inks with white dispersions dispersed with the comparative pigment dispersants described above, while still exhibiting good jettability. The example white inkjet inks disclosed herein exhibit good ink stability, good pen performance, good L*, and washfastness.

As used herein, "anionic copolymer dispersant" refers to an anionic copolymer dispersant formed from: i) a backbone forming monomer selected from the group consisting of acrylic acid, methacrylic acid, and combinations thereof; and ii) a side chain forming monomer selected from the group consisting of polyethyleneglycol methacrylate methyl ether, polyethyleneglycol methacrylate ethyl ether, and combinations thereof. Polyethyleneglycol methacrylate methyl ether and polyethyleneglycol methacrylate ethyl ether are hydrophilic macromonomers. It is to be understood that polyethyleneglycol (PEG) and polyethylene oxide (PEO) are synonymous.

In an example, the anionic copolymer dispersant is a copolymer of methacrylic acid and polyethyleneglycol methacrylate methyl ether (MeO-PEG-MA). MeO-PEG-MA has an acid number of about 100 mg KOH/g, and a weight average molecular weight (Mw) of about 16,900,000. In this example, the backbone forming monomer is methacrylic acid, and the side chain forming monomer is polyethyleneglycol methacrylate methyl ether.

The structure of methacrylic acid is:

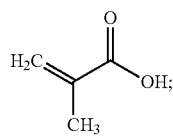

and the structure of polyethyleneglycol methacrylate methyl ether is:

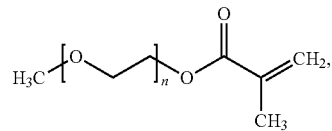

where n ranges from 10 to 1000.

Figure 10:
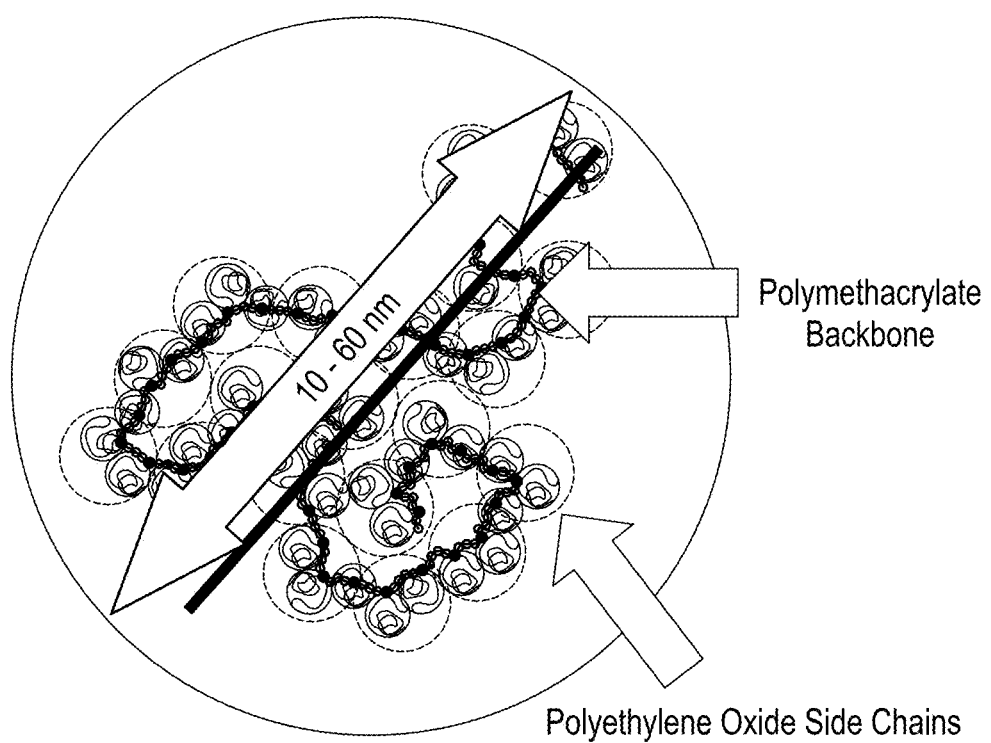
FIG. 10 is a schematic illustration showing the structure of polyethyleneglycol methacrylate methyl ether (MeO-PEG-MA).

A schematic illustration showing the structure of MeO-PEG-MA is shown in FIG. 10.

One commercially available example of MeO-PEG-MA is COADIS® BR 85, available from Coatex S.A. Corporation. COADIS® BR 85 is a liquid product having an acid number of about 100 mg KOH/g, and a weight average molecular weight (Mw) of about 16,900,000.

COADIS® BR 85 is generally used as a co-dispersant or "bumper" on top of a polyacrylate layer (formed from an acrylic dispersant) coating the white pigment.

However, in the example white inkjet inks disclosed herein, the white pigment is not coated with an acrylic dispersant. In the examples disclosed herein, the anionic copolymer dispersant (one example of which is commercially available as COADIS® BR 85) is the sole pigment dispersant in the white inkjet ink. In other words, no other pigment dispersants are included.

The anionic copolymer dispersant is added with the white pigment in the dispersion process. The amount of the anionic copolymer dispersant in the dispersion may range from about 0.1 wt % to about 5 wt %, based on the weight of the white pigment. The white pigment dispersion may then be incorporated into the ink vehicle so that the anionic copolymer dispersant is present in an amount ranging from about 0.005 wt % active to about 1 wt % active, based on a total weight of the white inkjet ink. In other examples, the anionic copolymer dispersant may be present in an amount ranging from about 0.1 wt % active to about 0.5 wt % active, based on a total weight of the white inkjet ink. In some examples, the anionic copolymer dispersant is present in an amount of about 0.2 wt % active, based on a total weight of the white inkjet ink.

Polymeric Binder

The white inkjet ink also includes a polymeric binder. In some examples, the polymeric binder is a polyurethane-based binder selected from the group consisting of a polyester-polyurethane binder, a polyether-polyurethane binder, a polycarbonate-polyurethane binder, and combinations thereof; or the polymeric binder is an acrylic latex binder.

In an example, the white inkjet ink includes the polyester-polyurethane binder. In an example, the polyester-polyurethane binder is a sulfonated polyester-polyurethane binder. The sulfonated polyester-polyurethane binder can include diaminesulfonate groups. In an example, the polyurethane-based binder is the polyester-polyurethane binder, the polyester-polyurethane binder is a sulfonated polyester-polyurethane binder, and is one of: i) an aliphatic compound including multiple saturated C4 to C10 carbon chains and/or an alicyclic carbon moiety, that is devoid of an aromatic moiety, or ii) an aromatic compound including an aromatic moiety and multiple saturated carbon chain portions ranging from C4 to C10 in length.

In one example, the sulfonated polyester-polyurethane binder can be anionic. In further detail, the sulfonated polyester-polyurethane binder can also be aliphatic, including saturated carbon chains as part of the polymer backbone or as a side-chain thereof, e.g., C2 to C10, C3 to C9, or C3 to C6 alkyl. The sulfonated polyester-polyurethane binder can also contain alicyclic carbon moiety. These polyester-polyurethane binders can be described as "aliphatic" because these carbon chains are saturated and because they are devoid of aromatic moieties. An example of a commercially available anionic aliphatic polyester-polyurethane binder that can be used is IMPRANIL® DLN-SD (CAS #375390-41-3; Mw 133,000; Acid Number 5.2; Tg −47° C.; Melting Point 175-200° C.) from Covestro. Example components used to prepare the IMPRANIL® DLN-SD or other anionic aliphatic polyester-polyurethane binders suitable for the examples disclosed herein can include pentyl glycols (e.g., neopentyl glycol); C4 to C10 alkyldiol (e.g., hexane-1,6-diol); C4 to C10 alkyl dicarboxylic acids (e.g., adipic acid); C4-C10 alkyldiamine (e.g., (2, 4, 4)-trimethylhexane-1,6-diamine (TMD), isophorone diamine (IPD)); C4 to C10 alkyl diisocyanates (e.g., hexamethylene diisocyanate (HDI), (2, 4, 4)-trimethylhexane-1,6-diisocyanate (TMDI)); alicyclic diisocyanates (e.g. isophorone diisocyanate (IPDI), 1,3-bis(isocyanatomethyl)cyclohexane (H6XDI)); diamine sulfonic acids (e.g., 2-[(2-aminoethyl)amino]ethanesulfonic acid); etc.

Alternatively, the sulfonated polyester-polyurethane binder can be aromatic (or include a commercially available aromatic moiety) and can include aliphatic chains. An example of an aromatic polyester-polyurethane binder that can be used is DISPERCOLL® U42 (CAS #157352-07-3). Example components used to prepare the DISPERCOLL® U42 or other similar aromatic polyester-polyurethane binders can include aromatic dicarboxylic acids, e.g., phthalic acid; C4 to C10 alkyl dialcohols (e.g., hexane-1,6-diol); C4 to C10 alkyl diisocyanates (e.g., hexamethylene diisocyanate (HDI)); diamine sulfonic acids (e.g., 2-[(2-aminoethyl)amino]ethanesulfonic acid); etc.

Other types of polyester-polyurethanes can also be used, including IMPRANIL® DL 1380, which can be somewhat more difficult to jet from thermal inkjet printheads compared to IMPRANIL® DLN-SD and DISPERCOLL® U42, but still can be acceptably jetted in some examples, and can also provide acceptable washfastness results on a variety of fabric types.

The polyester-polyurethane binders disclosed herein may have a weight average molecular weight (Mw, g/mol or Daltons) ranging from about 20,000 to about 1,000,000. In some examples of the white inkjet ink, the polyurethane-based binder is the polyester-polyurethane binder, and the polyester-polyurethane binder has a weight average molecular weight ranging from about 20,000 Mw to about 300,000 Mw. As examples, the weight average molecular weight can range from about 50,000 to about 500,000, from about 100,000 to about 400,000, or from about 150,000 to about 300,000.

The polyester-polyurethane binders disclosed herein may have an acid number that ranges from about 1 mg KOH/g to about 50 mg KOH/g. In some examples of the inkjet ink, the polyurethane-based binder is the polyester-polyurethane binder, and the polyester-polyurethane binder has an acid number that ranges from about 1 mg KOH/g to about 50 mg KOH/g. As other examples, the acid number of the polyester-polyurethane binder can range from about 1 mg KOH/g to about 200 mg KOH/g, from about 2 mg KOH/g to about 100 mg KOH/g, or from about 3 mg KOH/g to about 50 mg KOH/g. For this binder, the term "acid number" refers to the mass of potassium hydroxide (KOH) in milligrams that is used to neutralize one gram of the polyester-polyurethane binder.

To determine this acid number, a known amount of a sample of the polyester-polyurethane binder may be dispersed in water and the aqueous dispersion may be titrated with a polyelectrolyte titrant of a known concentration. In this example, a current detector for colloidal charge measurement may be used. An example of a current detector is the Mütek PCD-05 Smart Particle Charge Detector (available from BTG). The current detector measures colloidal substances in an aqueous sample by detecting the streaming potential as the sample is titrated with the polyelectrolyte titrant to the point of zero charge. An example of a suitable polyelectrolyte titrant is poly(diallyldimethylammonium chloride) (i.e., PolyDADMAC).

The average particle size of the polyester-polyurethane binders disclosed herein may range from about 20 nm to about 500 nm. As examples, the sulfonated polyester-polyurethane binder can have an average particle size ranging from about 20 nm to about 500 nm, from about 50 nm to about 350 nm, or from about 100 nm to about 350 nm. The particle size of any solids herein, including the average particle size of the dispersed polymer binder, can be determined using a NANOTRAC® Wave device, from Microtrac, e.g., NANOTRAC® Wave II or NANOTRAC® 150, etc., which measures particles size using dynamic light scattering. Average particle size can be determined using particle size distribution data (e.g., volume weighted mean diameter) generated by the NANOTRAC® Wave device.

Other examples of the white inkjet ink include a polyether-polyurethane binder. Examples of polyether-polyurethanes that may be used include IMPRANIL® LP DSB 1069, IMPRANIL® DLE, IMPRANIL® DAH, or IMPRANIL® DL 1116 (Covestro (Germany)); or HYDRAN® WLS-201 or HYDRAN® WLS-201K (DIC Corp. (Japan)); or TAKELAC® W-6061T or TAKELAC® WS-6021 (Mitsui (Japan)).

Still other examples of the white inkjet ink include a polycarbonate-polyurethane binder. Examples of polycarbonate-polyurethanes that may be used as the polyurethane-based binder include IMPRANIL® DLC-F or IMPRANIL® DL 2077 (Covestro (Germany)); or HYDRAN® WLS-213 (DIC Corp. (Japan)); or TAKELAC® W-6110 (Mitsui (Japan)).

Additional examples of the white inkjet ink include an acrylic latex binder. The acrylic latex binder includes latex particles. As used herein, the term "latex" refers to a stable dispersion of polymer particles in an aqueous medium. As such, the polymer (latex) particles may be dispersed in water or water and a suitable co-solvent. This aqueous latex dispersion may be incorporated into a suitable ink vehicle to form examples of the white inkjet ink.

The acrylic latex binder may be anionic or non-ionic depending upon the monomers used.

In some examples, the acrylic latex particles can include a polymerization product of monomers including: a copolymerizable surfactant; an aromatic monomer selected from styrene, an aromatic (meth)acrylate monomer, and an aromatic (meth)acrylamide monomer; and multiple aliphatic (meth)acrylate monomers or multiple aliphatic (meth)acrylamide monomers. The term "(meth)" indicates that the acrylamide, the acrylate, etc., may or may not include the methyl group. In one example, the latex particles can include a polymerization product of a copolymerizable surfactant such as HITENOL™ BC-10, BC-30, KH-05, or KH-10. In another example, the latex particles can include a polymerization product of styrene, methyl methacrylate, butyl acrylate, and methacrylic acid.

In another particular example, the latex particles can include a first heteropolymer phase and a second heteropolymer phase. The first heteropolymer phase is a polymerization product of multiple aliphatic (meth)acrylate monomers or multiple aliphatic (meth)acrylamide monomers. The second heteropolymer phase can be a polymerization product of an aromatic monomer with a cycloaliphatic monomer, wherein the aromatic monomer is an aromatic (meth)acrylate monomer or an aromatic (meth)acrylamide monomer, and wherein the cycloaliphatic monomer is a cycloaliphatic (meth)acrylate monomer or a cycloaliphatic (meth)acrylamide monomer. The second heteropolymer phase can have a higher glass transition temperature than the first heteropolymer phase. The first heteropolymer composition may be considered a soft polymer composition and the second heteropolymers composition may be considered a hard polymer composition.

The two phases can be physically separated in the latex particles, such as in a core-shell configuration, a two-hemisphere configuration, smaller spheres of one phase distributed in a larger sphere of the other phase, interlocking strands of the two phases, and so on.

The first heteropolymer composition can be present in the latex particles in an amount ranging from about 15 wt % to about 70 wt % of a total weight of the polymer (latex) particle and the second heteropolymer composition can be present in an amount ranging from about 30 wt % to about 85 wt % of the total weight of the polymer particle. In other examples, the first heteropolymer composition can be present in an amount ranging from about 30 wt % to about 40 wt % of a total weight of the polymer particle and the second heteropolymer composition can be present in an amount ranging from about 60 wt % to about 70 wt % of the total weight of the polymer particle. In one specific example, the first heteropolymer composition can be present in an amount of about 35 wt % of a total weight of the polymer particle and the second heteropolymers composition can be present in an amount of about 65 wt % of the total weight of the polymer particle.

As mentioned herein, the first heteropolymer phase can be polymerized from two or more aliphatic (meth)acrylate ester monomers or two or more aliphatic (meth)acrylamide monomers. The aliphatic (meth)acrylate ester monomers may be linear aliphatic (meth)acrylate ester monomers and/or cycloaliphatic (meth)acrylate ester monomers. Examples of the linear aliphatic (meth)acrylate ester monomers can include ethyl acrylate, ethyl methacrylate, benzyl acrylate, benzyl methacrylate, propyl acrylate, propyl methacrylate, isopropyl acrylate, isopropyl methacrylate, butyl acrylate, butyl methacrylate, isobutyl acrylate, isobutyl methacrylate, hexyl acrylate, hexyl methacrylate, isooctyl acrylate, isooctyl methacrylate, octadecyl acrylate, octadecyl methacrylate, lauryl acrylate, lauryl methacrylate, hydroxyethyl acrylate, hydroxyethyl methacrylate, hydroxyhexyl acrylate, hydroxyhexyl methacrylate, hydroxyoctadecyl acrylate, hydroxyoctadecyl methacrylate, hydroxylauryl methacrylate, hydroxylauryl acrylate, 2-ethylhexyl acrylate, 2-ethylhexyl methacrylate, and combinations thereof. Examples of the cycloaliphatic (meth)acrylate ester monomers can include cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, and combinations thereof.

Also as mentioned herein, the second heteropolymer phase can be polymerized from a cycloaliphatic monomer and an aromatic monomer. The cycloaliphatic monomer can be a cycloaliphatic (meth)acrylate monomer or a cycloaliphatic (meth)acrylamide monomer. The aromatic monomer can be an aromatic (meth)acrylate monomer or an aromatic (meth)acrylamide monomer. The cycloaliphatic monomer of the second heteropolymer phase can be cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, or a combination thereof. In still further examples, the aromatic monomer of the second heteropolymer phase can be 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxypropyl acrylate, 2-hydroxy-3-phenoxypropyl methacrylate, N-benzyl methacrylamide, N-benzyl acrylamide, N,N-diphenyl methacrylamide, N,N-diphenyl acrylamide, naphthyl methacrylate, naphthyl acrylate, phenyl methacrylate, phenyl acrylate, or a combination thereof.

The latex particles can have a particle size ranging from 20 nm to 500 nm, from 50 nm to 350 nm, or from 150 nm to 270 nm.

In some examples, the latex particles can be prepared by flowing multiple monomer streams into a reactor. An initiator can also be included in the reactor. The initiator may be selected from a persulfate, such as a metal persulfate or an ammonium persulfate. In some examples, the initiator may be selected from a sodium persulfate, ammonium persulfate or potassium persulfate. The preparation process may be performed in water, resulting in the aqueous latex dispersion.

Examples of anionic acrylic latex binders include JANTEX™ Binder 924 and JANTEX™ Binder 45 NRF (both of which are available from Jantex). Other examples of anionic acrylic latex binders include TEXICRYL™ 13-216, TEXICRYL™ 13-217, TEXICRYL™ 13-220, TEXICRYL™ 13-294, TEXICRYL™ 13-295, TEXICRYL™ 13-503, and TEXICRYL™ 13-813 (each of which is available from Scott Bader). Still other examples of anionic acrylic latex binders include TUBIFAST™ AS 4010 FF, TUBIFAST™ AS 4510 FF, and TUBIFAST™ AS 5087 FF (each of which is available from CHT).

Examples of non-ionic acrylic latex binders include PRINTRITE™ 595, PRINTRITE™ 2015, PRINTRITE™ 2514, PRINTRITE™ 9691, and PRINTRITE™ 96155 (each of which is available from Lubrizol Corporation). Another example of a non-ionic acrylic latex binder includes TEXICRYL™ 13-440 (available from Scott Bader).

In some examples of the white inkjet ink, the polymeric binder is present in an amount ranging from about 2 wt % active to about 20 wt % active, based on a total weight of the white inkjet ink. In another example, the polymeric binder can be present, in the white inkjet ink, in an amount ranging from about 2 wt % active to about 15 wt % active based on the total weight of the white inkjet ink. In still another example, the polymeric binder can be present, in the white inkjet ink, in an amount of about 10 wt % active, based on the total weight of the white inkjet ink. In yet another example, the polymeric binder can be present, in the white inkjet ink, in an amount of about 9.7 wt % active, based on the total weight of the white inkjet ink.

The polymeric binder (prior to being incorporated into the inkjet ink) may be dispersed in water alone or in combination with an additional water soluble or water miscible co-solvent, such as those described for the white pigment dispersion. It is to be understood however, that the liquid components of the binder dispersion become part of the aqueous vehicle in the white inkjet ink.

Aqueous Vehicle

In addition to the non-self-dispersed white pigment, the anionic copolymer dispersant, and the polymeric binder, the white inkjet ink includes an aqueous vehicle.

As used herein, the term "aqueous vehicle" may refer to the liquid with which the white pigment (dispersion, including the anionic copolymer dispersant), and the polymeric binder (dispersion) are mixed to form the white inkjet ink. A wide variety of vehicles may be used with the white inkjet ink of the present disclosure. In an example, the aqueous vehicle includes water and a co-solvent. In another example, the aqueous vehicle consists of water and the co-solvent. In some examples, the aqueous vehicle further includes an additive selected from the group consisting of an anti-decel agent, a surfactant, an anti-microbial agent, and combinations thereof. Some examples also include a pH adjuster. As such, in some examples, the aqueous vehicle consists of water and the co-solvent, and the anti-decel agent, the surfactant, the antimicrobial agent, the pH adjuster, or a combination thereof.

The aqueous vehicle may include co-solvent(s). The co-solvent(s) may be present in an amount ranging from about 4 wt % to about 30 wt % (based on the total weight of the white inkjet ink). In an example, the total amount of co-solvent(s) present in the white inkjet ink is about 13 wt % (based on the total weight of the white inkjet ink). In an example, the total amount of co-solvent(s) present in the white inkjet ink is about 19.2 wt % (based on the total weight of the white inkjet ink).

In an example, the co-solvent is a water soluble or water miscible organic co-solvent. Examples of co-solvents include alcohols, amides, esters, ketones, lactones, and ethers. In additional detail, the co-solvents may include aliphatic alcohols, aromatic alcohols, diols, glycol ethers, polyglycol ethers, lactams, formamides, acetamides, glycols, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers (e.g., DOWANOL™ TPM or DOWANOL™ TPnB (from Dow Chemical), higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of alcohols may include ethanol, isopropyl alcohol, butyl alcohol, and benzyl alcohol. Other specific examples include 2-ethyl-2-(hydroxymethyl)-1,3-propane diol (EPHD), dimethyl sulfoxide, sulfolane, and/or alkyldiols such as 1,2-hexanediol.

The co-solvent may also be a polyhydric alcohol or a polyhydric alcohol derivative. Examples of polyhydric alcohols may include ethylene glycol, diethylene glycol, propylene glycol, butylene glycol, triethylene glycol, 1,5-pentanediol, 1,2-butanediol, 1,3-butanediol, 1,3-propanediol, 1,2-hexanediol, 1,2,6-hexanetriol, glycerin, trimethylolpropane, and xylitol. Examples of polyhydric alcohol derivatives may include an ethylene oxide adduct of diglycerin.

The co-solvent may also be a nitrogen-containing solvent. Examples of nitrogen-containing solvents may include 2-pyrrolidone, 1-(2-hydroxyethyl)-2-pyrrolidone, N-methyl-2-pyrrolidone, cyclohexylpyrrolidone, and triethanolamine.

The aqueous vehicle may include anti-decel agent(s). The anti-decel agent may function as a humectant. Decel refers to a decrease in drop velocity over time with continuous firing. In the examples disclosed herein, the anti-decel agent (s) is/are included to assist in preventing decel. In some examples, the anti-decel agent may improve the jettability of the white inkjet ink. The anti-decel agent(s) may be present in an amount ranging from about 0.2 wt % active to about 5 wt % active (based on the total weight of the inkjet ink). In an example, the anti-decel agent is present in the inkjet ink in an amount of about 1 wt % active, based on the total weight of the inkjet ink.

An example of a suitable anti-decel agent is ethoxylated glycerin having the following formula:

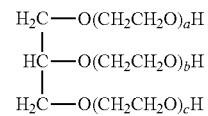

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

The aqueous vehicle of the white inkjet ink may also include surfactant(s). In any of the examples disclosed herein, the surfactant may be present in an amount ranging from about 0.01 wt % active to about 5 wt % active (based on the total weight of the white inkjet ink). In an example, the surfactant is present in the white inkjet ink in an amount ranging from about 0.05 wt % active to about 3 wt % active, based on the total weight of the white inkjet ink. In another example, the surfactant is present in the white inkjet ink in an amount of about 0.3 wt % active, based on the total weight of the white inkjet ink.

The surfactant may include anionic and/or non-ionic surfactants. Examples of the anionic surfactant may include alkylbenzene sulfonate, alkylphenyl sulfonate, alkylnaphthalene sulfonate, higher fatty acid salt, sulfate ester salt of higher fatty acid ester, sulfonate of higher fatty acid ester, sulfate ester salt and sulfonate of higher alcohol ether, higher alkyl sulfosuccinate, polyoxyethylene alkylether carboxylate, polyoxyethylene alkylether sulfate, alkyl phosphate, and polyoxyethylene alkyl ether phosphate. Specific examples of the anionic surfactant may include dodecylbenzenesulfonate, isopropylnaphthalenesulfonate, monobutylphenylphenol monosulfonate, monobutylbiphenyl sulfonate, monobutylbiphenylsulfonate, and dibutylphenylphenol disulfonate. Examples of the non-ionic surfactant may include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, polyoxyethylene alkylamine, polyoxyethylene fatty acid amide, alkylalkanolamide, polyethylene glycol polypropylene glycol block copolymer, acetylene glycol, and a polyoxyethylene adduct of acetylene glycol. Specific examples of the non-ionic surfactant may include polyoxyethylenenonyl phenylether, polyoxyethyleneoctyl phenylether, and polyoxyethylenedodecyl. Further examples of the non-ionic surfactant may include silicon surfactants such as a polysiloxane oxyethylene adduct; fluorine surfactants such as perfluoroalkylcarboxylate, perfluoroalkyl sulfonate, and oxyethyleneperfluoro alkylether; and biosurfactants such as spiculisporic acid, rhamnolipid, and lysolecithin.

In some examples, the aqueous vehicle may include a silicone-free alkoxylated alcohol surfactant such as, for example, TEGO® Wet 510 (Evonik Degussa) and/or a self-emulsifiable wetting agent based on acetylenic diol chemistry, such as, for example, SURFYNOL® SE-F (Evonik Degussa). Other suitable commercially available surfactants include SURFYNOL® 465 (ethoxylatedacetylenic diol), SURFYNOL® 440 (an ethoxylated low-foam wetting agent) SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Evonik Degussa); ZONYL® FSO (a.k.a. CAPSTONE® FS-35, which is a water-soluble, ethoxylated non-ionic fluorosurfactant from DuPont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Company); and BYK® 345, BYK® 346, BYK® 347, BYK® 348, BYK® 349 (each of which is a silicone surfactant) (all of which are available from BYK Chemie).

The aqueous vehicle may also include anti-microbial agent(s). Anti-microbial agents are also known as biocides and/or fungicides. In an example, the total amount of anti-microbial agent(s) in the white inkjet ink ranges from about 0.01 wt % active to about 0.05 wt % active (based on the total weight of the white inkjet ink). In another example, the total amount of anti-microbial agent(s) in the inkjet ink is about 0.04 wt % active (based on the total weight of the inkjet ink). In some instances, the anti-microbial agent may be present in the pigment dispersion that is mixed with the liquid vehicle.

Examples of suitable anti-microbial agents include the NUOSEPT® (Ashland Inc.), UCARCIDE™ or KORDEK™ or ROCIMA™ (The Dow Chemical Company), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (The Dow Chemical Company), and combinations thereof.

The aqueous vehicle may also include a pH adjuster. A pH adjuster may be included in the white inkjet ink to achieve a desired pH (e.g., 8.5) and/or to counteract any slight pH drop that may occur over time. In an example, the total amount of pH adjuster(s) in the white inkjet ink ranges from greater than 0 wt % to about 0.1 wt % (based on the total weight of the white inkjet ink). In another example, the total amount of pH adjuster(s) in the white inkjet ink is about 0.03 wt % (based on the total weight of the white inkjet ink).

Examples of suitable pH adjusters include metal hydroxide bases, such as potassium hydroxide (KOH), sodium hydroxide (NaOH), etc. In an example, the metal hydroxide base may be added to the white inkjet ink in an aqueous solution. In another example, the metal hydroxide base may be added to the white inkjet ink in an aqueous solution including 5 wt % of the metal hydroxide base (e.g., a 5 wt % potassium hydroxide aqueous solution).

Suitable pH ranges for examples of the white inkjet ink can be from pH 7 to pH 11, from pH 7 to pH 10, from pH 7.2 to pH 10, from pH 7.5 to pH 10, from pH 8 to pH 10, 7 to pH 9, from pH 7.2 to pH 9, from pH 7.5 to pH 9, from pH 8 to pH 9, from 7 to pH 8.5, from pH 7.2 to pH 8.5, from pH 7.5 to pH 8.5, from pH 8 to pH 8.5, from 7 to pH 8, from pH 7.2 to pH 8, or from pH 7.5 to pH 8.

The balance of the white inkjet ink is water. In an example, purified water or deionized water may be used. The water included in the white inkjet ink may be: i) part of the white pigment dispersion, the binder dispersion, and/or the anionic copolymer dispersant, ii) part of the aqueous vehicle, iii) added to a mixture of the white pigment dispersion, the binder dispersion, and/or the anionic copolymer dispersant and the aqueous vehicle, or iv) a combination thereof. In some examples the white inkjet ink is a thermal inkjet ink, and the liquid vehicle includes at least 70% by weight of water. In examples where the white inkjet ink is a piezoelectric inkjet ink, the liquid vehicle is a solvent based vehicle including at least 50% by weight of the co-solvent.

Fixer Composition

Some examples of the white inkjet may be included in a fluid set or a textile printing kit with a fixer composition. In the examples disclosed herein, the fixer composition includes a cationic polymer and an aqueous fixer vehicle. In some examples, the fixer composition consists of the cationic polymer and the aqueous fixer vehicle. In other examples, the fixer composition may include additional components.

Cationic Polymer

The cationic polymer included in the fixer composition has a weight average molecular weight ranging from about 3,000 to about 3,000,000. Any weight average molecular weight throughout this disclosure has a unit of g/mol or Daltons.

Examples of the cationic polymer are selected from the group consisting of poly(diallyldimethylammonium chloride); poly(methylene-co-guanidine) anion, wherein the anion is selected from the group consisting of hydrochloride, bromide, nitrate, sulfate, and sulfonates; a polyamine; poly (dimethylamine-co-epichlorohydrin); a polyethylenimine; a polyamide epichlorohydrin resin; a polyamine epichlorohydrin resin; and a combination thereof. Some examples of commercially available polyamine epichlorohydrin resins may include CREPETROL™ 73, KYMENE™ 736, KYMENE™ 736NA, POLYCUP™ 7360, and POLYCUP™ 7360A, each of which is available from Solenis LLC.

In an example, the cationic polymer of the fixer composition is present in an amount ranging from about 1 wt % active to about 15 wt % active based on a total weight of the fixer composition. In further examples, the cationic polymer is present in an amount ranging from about 1 wt % active to about 10 wt % active; or from about 4 wt % active to about 8 wt % active; or from about 2 wt % active to about 7 wt % active; or from about 6 wt % active to about 10 wt % active, based on a total weight of the fixer composition.

Fixer Vehicle

As mentioned above, the fixer composition also includes the aqueous fixer vehicle. As used herein, the term "aqueous fixer vehicle" may refer to the liquid in which the cationic polymer is mixed to form the fixer composition.

In an example of the fixer composition, the aqueous fixer vehicle includes a surfactant, a co-solvent, an anti-kogation agent, and a balance of water. In another example, the fixer composition further comprises a pH adjuster. As such, some examples of the aqueous fixer vehicle (and thus the fixer composition) include a surfactant, a co-solvent, an anti-kogation agent, and/or a pH adjuster.

The surfactant in the fixer composition may be any example of the non-ionic surfactants set forth herein for the white inkjet ink or may be a cationic surfactant. The amount of the non-ionic or cationic surfactant may be any amount set forth herein for the surfactant(s) in the white inkjet ink (except that the amount(s) are based on the total weight of the fixer composition instead of the white inkjet ink).

Examples of the cationic surfactant include quaternary ammonium salts, such as benzalkonium chloride, benzethonium chloride, methylbenzethonium chloride, cetalkonium chloride, cetylpyridinium chloride, cetrimonium, cetrimide, dofanium chloride, tetraethylammonium bromide, didecyldimethylammonium chloride, domiphen bromide, alkylbenzyldimethylammonium chlorides, distearyldimethylammonium chloride, diethyl ester dimethyl ammonium chloride, dipalmitoylethyl hydroxyethylmonium methosulfate, and ACCOSOFT® 808 (methyl (1) tallow amidoethyl (2) tallow imidazolinium methyl sulfate available from Stepan Company). Other examples of the cationic surfactant include amine oxides, such as lauryldimethylamine oxide, myristamine oxide, cocamine oxide, stearamine oxide, and cetamine oxide.

The co-solvent in the fixer composition may be any example of the co-solvents set forth herein for the white inkjet ink, in any amount set forth herein for the white inkjet ink (except that the amount(s) are based on the total weight of the fixer composition instead of the white inkjet ink).

An anti-kogation agent may also be included in a fixer composition that is to be thermal inkjet printed. Kogation refers to the deposit of dried printing liquid on a heating element of a thermal inkjet printhead. Anti-kogation agent(s) is/are included to assist in preventing the buildup of kogation. In some examples, the anti-kogation agent may improve the jettability of the pre fixer composition. The anti-kogation agent(s) may be present in the fixer composition in a total amount ranging from about 0.1 wt % active to about 1.5 wt % active, based on the total weight of the fixer composition. In an example, the anti-kogation agent(s) is/are present in an amount of about 0.5 wt % active, based on the total weight of the fixer composition.

Examples of suitable anti-kogation agents include oleth-3-phosphate (commercially available as CRODAFOS® O3A or CRODAFOS® N-3A), oleth-5-phosphate (commercially available as CRODAFOS® O5A), or dextran 500k. Other suitable examples of the anti-kogation agents include CRODAFOS® HCE (phosphate-ester from Croda Int.), CRODAFOS® CES (phosphate-based emulsifying and conditioning wax from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. It is to be understood that any combination of the anti-kogation agents listed may be used.

A pH adjuster may also be included in the fixer composition. A pH adjuster may be included in the fixer composition to achieve a desired pH (e.g., about 4) and/or to counteract any slight pH increase that may occur over time. In an example, the total amount of pH adjuster(s) in the fixer composition ranges from greater than 0 wt % to about 0.1 wt % (based on the total weight of the fixer composition). In another example, the total amount of pH adjuster(s) in the fixer composition is about 0.03 wt % (based on the total weight of the fixer composition).

An example of a suitable pH adjuster that may be used in the fixer composition includes methane sulfonic acid, nitric acid and phosphoric acid.

Suitable pH ranges for examples of the fixer composition can be less than pH 7, from pH 2 to less than pH 7, from pH 5.5 to less than pH 7, from pH 5 to pH 6.6, or from pH 5.5 to pH 6.6. In one example, the pH of the fixer composition is pH 4.

The balance of the fixer composition is water. As such, the weight percentage of the water present in the fixer composition will depend, in part, upon the weight percentages of the other components. The water may be purified water or deionized water.

The viscosity of the fixer composition may vary depending upon the application method that is to be used to apply the fixer composition. As an example, when the fixer composition is to be applied with an analog applicator, the viscosity of the fixer composition may range from about 1 centipoise (cP) to about 300 cP (at 20° C. to 25° C. and a shear rate of about 3,000 Hz). As other examples, when the fixer composition is to be applied with an thermal inkjet applicator/printhead, the viscosity of the fixer composition may range from about 1 cP to about 9 cP (at 20° C. to 25° C. and a shear rate of about 3,000 Hz), and when the fixer composition is to be applied with an piezoelectric inkjet applicator/printhead, the viscosity of the fixer composition may range from about 1 cP to about 20 cP (at 20° C. to 25° C. and a shear rate of about 3,000 Hz).

Sets and Kits

The white inkjet ink and the fixer composition may be part of a fluid set. An example of the fluid set disclosed herein is shown schematically in FIG. 1. As depicted, the fluid set 10 comprises a fixer composition 12 including a cationic polymer and an aqueous fixer vehicle; and a white inkjet ink 14 including a non-self-dispersed white pigment, from about 0.005 wt % active to about 1 wt % active, based on a total weight of the white inkjet ink, of an anionic copolymer dispersant having a weight average molecular weight (Mw) ranging from about 125,000 g/mol to about 30,000,000 g/mol, a polymeric binder, and an aqueous vehicle. It is to be understood that any example of the fixer composition 12 and the white inkjet ink 14 disclosed herein may be used in the examples of the fluid set 10.

In any example of the fluid set 10, the fixer composition 12 and the inkjet ink 14 may be maintained in separate containers (e.g., respective reservoirs/fluid supplies of respective inkjet cartridges) or separate compartments (e.g., respective reservoirs/fluid supplies) in a single container (e.g., inkjet cartridge).

The fluid set 10 may also be part of a textile printing kit 18 which is also shown schematically in FIG. 1. Thus, the textile printing kit 18 includes the fixer composition 12 including a cationic polymer and an aqueous fixer vehicle; and the white inkjet ink 14 including a non-self-dispersed white pigment, from about 0.005 wt % active to about 1 wt % active, based on a total weight of the white inkjet ink, of an anionic copolymer dispersant having a weight average molecular weight (Mw) ranging from about 125,000 g/mol to about 30,000,000 g/mol, a polymeric binder, and an aqueous vehicle. In an example, the textile printing kit 18 also includes a textile fabric 16 selected from the group consisting of polyester fabrics, polyester blend fabrics, cotton fabrics, cotton blend fabrics, nylon fabrics, nylon blend fabrics, silk fabrics, silk blend fabrics, wool fabrics, wool blend fabrics, and combinations thereof.

Textile Fabrics

In the examples disclosed herein, the textile fabric 16 may be selected from the group consisting of polyester fabrics, polyester blend fabrics, cotton fabrics, cotton blend fabrics, nylon fabrics, nylon blend fabrics, silk fabrics, silk blend fabrics, wool fabrics, wool blend fabrics, and combinations thereof. In a further example, the textile fabric 16 is selected from the group consisting of cotton fabrics and cotton blend fabrics.

It is to be understood that organic textile fabrics and/or inorganic textile fabrics may be used for the textile fabric 16. Some types of fabrics that can be used include various fabrics of natural and/or synthetic fibers. It is to be understood that the polyester fabrics may be a polyester coated surface. The polyester blend fabrics may be blends of polyester and other materials (e.g., cotton, linen, etc.). In another example, the textile fabric 18 may be selected from nylons (polyamides) or other synthetic fabrics.

Example natural fiber fabrics that can be used include treated or untreated natural fabric textile substrates, e.g., wool, cotton, silk, linen, jute, flax, hemp, rayon fibers, thermoplastic aliphatic polymeric fibers derived from renewable resources (e.g. cornstarch, tapioca products, sugarcanes), etc. Example synthetic fibers used in the textile fabric/substrate 18 can include polymeric fibers such as nylon fibers, polyvinyl chloride (PVC) fibers, PVC-free fibers made of polyester, polyamide, polyimide, polyacrylic, polypropylene, polyethylene, polyurethane, polystyrene, polyaramid (e.g., KEVLAR®) polytetrafluoroethylene (TEFLON®) (both trademarks of E.I. du Pont de Nemours and Company, Delaware), fiberglass, polytrimethylene, polycarbonate, polyethylene terephthalate, polyester terephthalate, polybutylene terephthalate, or a combination thereof. In an example, natural and synthetic fibers may be combined at ratios of 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, or vice versa. In some examples, the fiber can be a modified fiber from the above-listed polymers. The term "modified fiber" refers to one or both of the polymeric fiber and the fabric as a whole having undergone a chemical or physical process such as, but not limited to, copolymerization with monomers of other polymers, a chemical grafting reaction to contact a chemical functional group with one or both the polymeric fiber and a surface of the fabric, a plasma treatment, a solvent treatment, acid etching, or a biological treatment, an enzyme treatment, or antimicrobial treatment to prevent biological degradation.

In addition, the textile fabric 16 can contain additives, such as a colorant (e.g., pigments, dyes, and tints), an antistatic agent, a brightening agent, a nucleating agent, an antioxidant, a UV stabilizer, a filler, and/or a lubricant, for example.

It is to be understood that the terms "textile fabric" or "fabric substrate" do not include materials commonly known as any kind of paper (even though paper can include multiple types of natural and synthetic fibers or mixtures of both types of fibers). Fabric substrates can include textiles in filament form, textiles in the form of fabric material, or textiles in the form of fabric that has been crafted into finished articles (e.g., clothing, blankets, tablecloths, napkins, towels, bedding material, curtains, carpet, handbags, shoes, banners, signs, flags, etc.). In some examples, the fabric substrate can have a woven, knitted, non-woven, or tufted fabric structure. In one example, the fabric substrate can be a woven fabric where warp yarns and weft yarns can be mutually positioned at an angle of about 90°. This woven fabric can include fabric with a plain weave structure, fabric with twill weave structure where the twill weave produces diagonal lines on a face of the fabric, or a satin weave. In another example, the fabric substrate can be a knitted fabric with a loop structure. The loop structure can be a warp-knit fabric, a weft-knit fabric, or a combination thereof. A warp-knit fabric refers to every loop in a fabric structure that can be formed from a separate yarn mainly introduced in a longitudinal fabric direction. A weft-knit fabric refers to loops of one row of fabric that can be formed from the same yarn. In a further example, the fabric substrate can be a non-woven fabric. For example, the non-woven fabric can be a flexible fabric that can include a plurality of fibers or filaments that are one or both bonded together and interlocked together by a chemical treatment process (e.g., a solvent treatment), a mechanical treatment process (e.g., embossing), a thermal treatment process, or a combination of multiple processes.

In one example, the textile fabric 16 can have a basis weight ranging from 10 gsm (grams per square meter) to 500 gsm. In another example, the textile fabric 18 can have a basis weight ranging from 50 gsm to 400 gsm. In other examples, the textile fabric 18 can have a basis weight ranging from 100 gsm to 300 gsm, from 75 gsm to 250 gsm, from 125 gsm to 300 gsm, or from 150 gsm to 350 gsm.

The textile fabric 16 may be any color, and in an example is a color other than white.

Printing Method and System

In some examples of a printing method, the white inkjet ink 14 is directly printed on a textile fabric 16.

Figure 2:
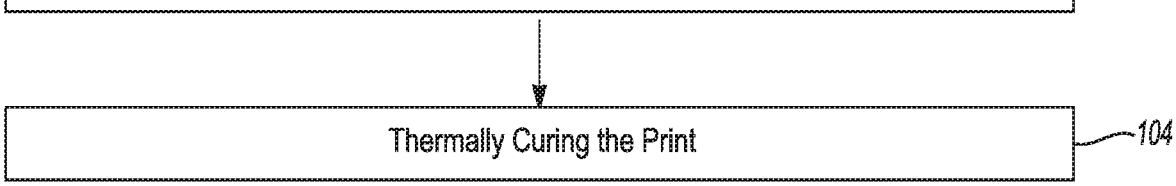
FIG. 2 is a flow diagram illustrating an example printing method.

In other examples of the printing method, the fixer composition 12 is directly printed on the textile fabric 16, and then the white inkjet ink 14 is printed on the fixer composition 12. FIG. 2 depicts an example of this printing method 100. As shown in FIG. 2, an example of the printing method 100 comprises generating a print by: applying a fixer composition 12 on a textile fabric 16 to form a fixer composition layer, the fixer composition 12 including a cationic polymer and an aqueous fixer vehicle; and inkjet printing a white inkjet ink 14 on the fixer composition layer to form an ink layer, the white inkjet ink 14 including a non-self-dispersed white pigment, from about 0.005 wt % active to about 1 wt % active, based on a total weight of the white inkjet ink, of an anionic copolymer dispersant having a weight average molecular weight (Mw) ranging from about 125,000 g/mol to about 30,000,000 g/mol, a polymeric binder, and an aqueous vehicle (reference numeral 102); and thermally curing the print (reference numeral 104).

It is to be understood that any example of the fixer composition 12 and the white inkjet ink 14 may be used in the examples of the method 100. Further, it is to be understood that any example of the textile fabric 16 may be used in the examples of the method 100.

As shown in reference numeral 102 in FIG. 2, the method 100 includes generating the print.

When generating the print, the fixer composition 12 is applied to the textile fabric 16. The application of the fixer composition 12 may be accomplished via an analog method or via a digital inkjet printing method. The method used may depend upon the viscosity of the fixer composition 14.

When an analog method is used, the fixer composition 12 may be applied using an auto analog pretreater, a drawdown coater, a slot die coater, a roller coater, a fountain curtain coater, a blade coater, a rod coater, an air knife coater, a sprayer, or a gravure application. In these examples, the fixer composition 12 may be coated on all or substantially all of the textile fabric 16. As such, the fixer composition layer that is formed may be a continuous layer that covers all or substantially all of the textile fabric 16.

When a digital inkjet printing method is used, the fixer composition 12 may be applied using inkjet printing, such as thermal inkjet printing or piezoelectric inkjet printing. Any suitable inkjet applicator, such as a thermal inkjet printhead, a piezoelectric printhead, a continuous inkjet printhead, etc. may be used. In these examples, fixer composition 12 may be printed at desirable areas. As such, the fixer composition layer that is formed by the application of the fixer composition 12 may be non-continuous. In other words, the fixer composition layer may contain gaps where no fixer composition 12 is printed.

In an example, the amount of fixer composition 12 depends upon the amount of white inkjet ink 14 that is to be applied. In some examples, the fixer composition 12 is applied in an amount ranging from about 10 gsm to about 100 gsm. In other examples, the fixer composition 12 is applied in an amount ranging from about 50 gsm to about 75 gsm.

As shown in reference numeral 102 in FIG. 2, generating the print also includes inkjet printing the white inkjet ink 14 on the fixer composition layer. It is to be understood that the white inkjet ink 14 is printed at desirable areas to form an image.

The white inkjet ink 14 may sit idle between print jobs. As such, any example of the printing method disclosed herein may include mixing the white inkjet ink 14 prior to inkjet printing the white inkjet ink 14. In some examples, the printer may be configured to shake the cartridge or pen including the white inkjet ink 14. In other examples, the print cartridge or pen may be configured to mix the white inkjet ink 14 prior to printing. In still other examples, the printer may be configured to re-circulate the white inkjet ink 14 (and thus mixing the components) prior to printing. The anionic copolymer dispersant in the white inkjet ink 14 has been found to help re-disperse the white pigment that has settled into sediment during idling, thus recovering the jettability of the ink 14.

In an example, the white inkjet ink 14 is applied in an amount ranging from about 200 gsm to about 400 gsm. In another example, the white inkjet ink 14 is applied in an amount ranging from about 200 gsm to about 350 gsm.

In some examples, multiple inkjet inks (including the white inkjet ink 14) may be inkjet printed onto the textile fabric 16. In these examples, each of the other inkjet inks may include a pigment, an example of the polymeric binder, and the ink vehicle. Each of the inkjet inks may include a different colored pigment so that a different color (e.g., cyan, magenta, yellow, black, violet, green, brown, orange, purple, etc.) is generated by each of the inkjet inks.

In other examples, a single (re-dispersible) white inkjet ink 14 may be inkjet printed onto the textile fabric 16.

In some examples of the method 100, the white inkjet ink 14 is printed onto the fixer composition layer while the fixer composition layer is wet. Wet on wet printing may be desirable because less fixer composition 12 may be applied during this process (as compared to when the fixer composition 12 is dried prior to inkjet ink 14 application), and because the printing workflow may be simplified without the additional drying. In an example of wet on wet printing, the white inkjet ink 14 is printed onto the fixer composition layer within a period of time ranging from about 0.01 second to about 30 seconds after the fixer composition 12 is printed. In further examples, the white inkjet ink 14 is printed onto the composition fixer layer within a period of time ranging from about 0.1 second to about 20 seconds; or from about 0.2 second to about 10 seconds; or from about 0.2 second to about 5 seconds after the fixer composition 12 is applied to form the fixer composition layer. Wet on wet printing may be accomplished in a single pass.

In another example of the method 100, drying takes place after the application of the fixer composition 12 and before the application of the white inkjet ink 14. As such, the fixer composition 12 may be dried on the textile fabric 16 before the white inkjet ink 14 is applied. It is to be understood that in this example, drying of the fixer composition 12 may be accomplished in any suitable manner, e.g., air dried or heated (e.g., at a temperature ranging from about 20° C. to about 80° C. for 30 seconds to 5 minutes), exposure to electromagnetic radiation (e.g. infra-red (IR) radiation for 5 seconds), and/or the like. When drying is performed, the fixer composition 12 and the white inkjet ink 14 may be applied in separate passes to allow time for the drying to take place.

In some examples of the method 100, the inkjet printing of the fixer composition 12 and/or the white inkjet ink 14 may be accomplished at high printing speeds. In an example, the inkjet printing of the fixer composition 12 and/or the white inkjet ink 14 may be accomplished at a printing speed of at least 25 feet per minute (fpm). In another example, the fixer composition 12 and/or the white inkjet ink 14 may be inkjet printed at a printing speed ranging from 100 fpm to 1000 fpm.

As shown in reference numeral 104 in FIG. 1, the method 100 includes thermally curing the print. The thermal curing of the print may be accomplished by applying heat to the print. In an example of the method 100, the thermal curing involves heating the print to a temperature ranging from about 80° C. to about 200° C., for a period of time ranging from about 10 seconds to about 15 minutes. In another example, the temperature ranges from about 100° C. to about 180° C. In still another example, thermal curing is achieved by heating the print to a temperature of 150° C. for about 3 minutes.

Figure 3:
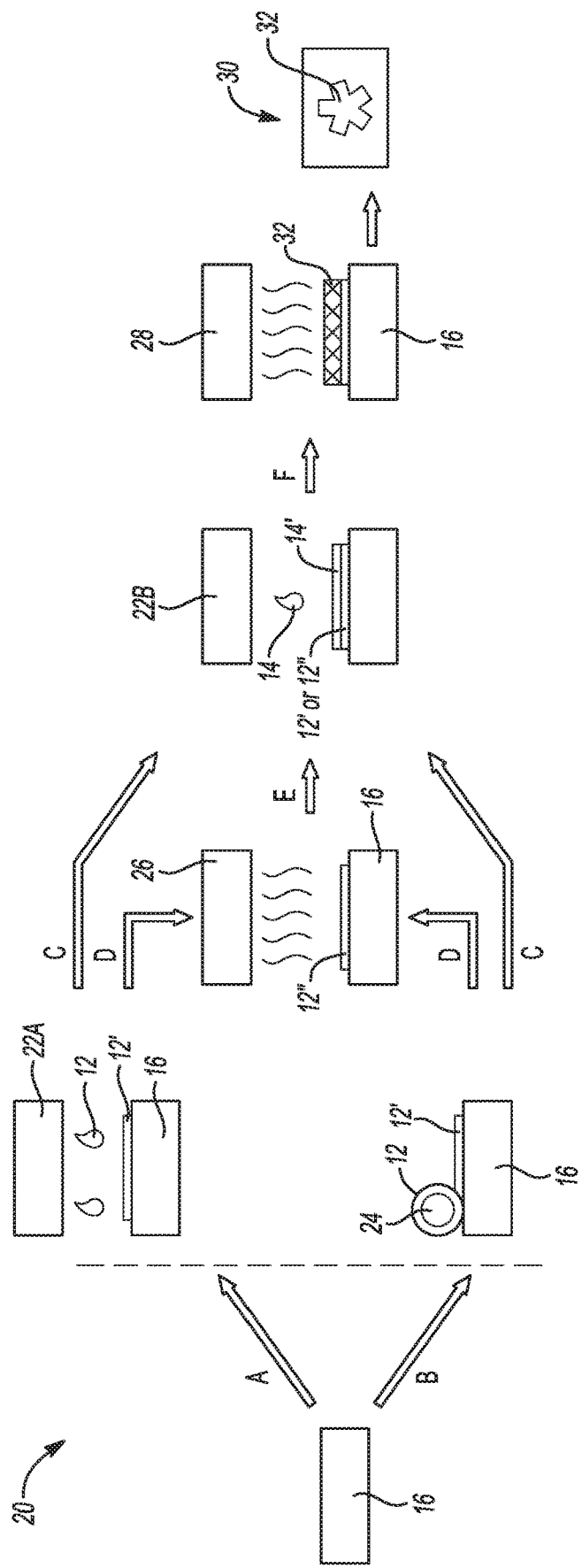
FIG. 3 is a schematic diagram of an example of a printing system.

Referring now to FIG. 3, a schematic diagram of a printing system 20 is depicted. In the printing system 20, the textile fabric/substrate 16 may be exposed to paths A, C and F, or paths B, C, and F, or paths A, D, E, and F, or paths B, D, E, and F.

The textile fabric/substrate 16 may be initially transported through the printing system 20 along one of two paths (as shown by the arrows A and B). Along either path A or path B, an example of the fixer composition 12 is applied to the textile fabric 16. In the example shown along path A, the fixer composition 12 is applied digitally by inkjet printhead 22A. In the example shown along path B, the fixer composition 12 is applied using an analog applicator 24 (e.g., an auto analog pre-treater, a drawdown coater, a slot die coater, a roller coater, a fountain curtain coater, a blade coater, a rod coater, an air knife coater, a sprayer, or a gravure application).

The digital (path A) or analog (path B) application of the fixer composition 12 forms a wet fixer composition layer 12' on the textile fabric 16. In some examples, the white inkjet ink 14 is then applied to the textile fabric 16 having the wet fixer composition layer 12' thereon. In this example, path A or path B proceeds along path C, where the white inkjet ink 14 is applied to the wet fixer composition layer 12'.

In another example, path A or path B proceeds along path D, where the wet fixer composition layer 12' is dried, and then path E, where the white inkjet ink 14 is applied to the dried fixer composition layer 12". Along path D, the wet fixer composition layer 12' is exposed to heating. The application of heat may be accomplished, for example, using a dryer 26 or other suitable heating mechanism. This process forms a dried fixer composition layer 12". From path E, the white inkjet ink 14 is re-dispersed and then applied onto the dried fixer composition layer 12".

Along either path C or path E, the white inkjet ink 14 is applied via an inkjet printhead 22B to from an ink layer 14'.

Additional drying/heating may be performed along paths A and C or A and E. For example, the air temperature may range from about 10° C. to about 90° C., such that water may be at least partially evaporated from the layers 12', 14'.

Each example proceeds along path F, where thermal curing is performed. During curing, the compositions/layers are heated to cure the print. Any heating mechanism 28, such as a dryer or an oven, may be used. The heat is sufficient to initiate crosslinking or other interactions that bind the white pigment onto the textile fabric 16. The heat to initiate fixation (thermal curing) may range from about 80° C. to 200° C. as described above. This process forms the printed article 30 including the image 32 formed on the textile fabric 16.

To further illustrate the present disclosure, examples are given herein. It is to be understood that these examples are provided for illustrative purposes and are not to be construed as limiting the scope of the present disclosure.

EXAMPLES

Example 1

Three examples of the white inkjet ink were prepared with different examples of $TiO_2$ pigment. Commercially available $TiO_2$ pigments were used, namely TI-PURE® R960, TI-PURE® TS-6300, and TI-PURE® R706, all available from Chemours. A commercially available anionic copolymer dispersant was used, namely COADIS® BR 85. Comparative white inks were also prepared with the commercially available $TiO_2$ pigments but without any COADIS® BR 85 (comparative pigment dispersants were used).

To prepare all of the inks, a white pigment dispersion was first prepared. The general formulation of each example and comparative white pigment dispersion included in each of the inks is shown in Table 1, with the wt % active of each component that was used.

TABLE 1

| Ingredient | Specific Component | Exp. Disp-1 wt % active | Exp. Disp-2 wt % active | Exp. Disp-3 wt % active | Comp. Disp-1 wt % active | Comp. Disp-2 wt % active | Comp. Disp-3 wt % active | Comp Disp-4 wt % active | Comp-Disp-5 wt % active |
|---|---|---|---|---|---|---|---|---|---|
| White pigment | TI-PURE ® R706 | 55 | | | 55 | | | 55 | |
| | TI-PURE ® R960 | | 55 | | | 55 | | | 55 |
| | TI-PURE ® TS-6300 | | | 55 | | | 55 | | |
| Pigment dispersant | COADIS ® BR 85 | 1.1 | 1.1 | 1.1 | | | | | |
| | DISPERBYK ®-190 | | | | 0.44 | 0.44 | 0.44 | | |
| | CARBOSPERSE ® K7028 | | | | 0.275 | 0.275 | 0.275 | | |
| | JONCRYL ® 683 | | | | | | | 3 | |
| | COADIS ® BR 40 | | | | | | | | 0.275 |
| Water | Deionized water | Balance | Balance | Balance | Balance | Balance | Balance | Balance | Balance |

Each of the inks had the same formulation except for the type of pigment and the pigment dispersant that was used. The general formulation of the example and comparative inks is shown in Table 2 and Table 3, with the wt % active of each component that was used (e.g., wt % active white pigment, not total amount of white dispersion). A 5 wt % potassium hydroxide aqueous solution was added to each of the inks until a pH of about 8.0 to 8.5 was achieved.

TABLE 2

| Ingredient | Specific Component | Ex Ink A1 (wt % active) | Ex Ink A2 (wt % active) | Ex Ink A3 (wt % active) |
|---|---|---|---|---|
| Pigment dispersion | Exp. Disp-1 | 10 (wt % active of the pigment) | 0 | 0 |
| | Exp. Disp-2 | 0 | 10 (wt % active of the pigment) | 0 |
| | Exp. Disp-3 | 0 | 0 | 10 (wt % active of the pigment) |
| Binder | Polyester polyurethane | 10 | 10 | 10 |
| Co-solvent | 1,3-propanediol | 12 | 12 | 12 |
| | Tripropylene glycol methyl ether | 1 | 1 | 1 |
| Anti-decel agent | LIPONIC ® EG-1 | 2 | 2 | 2 |
| Surfactant | SURFYNOL ® 440 | 0.3 | 0.3 | 0.3 |
| Antimicrobial agent | ACTICIDE ® B20 | 0.04 | 0.04 | 0.04 |
| Water | Deionized water | Balance | Balance | Balance |

Example Inks A1-A3 do not include a rheology modifier.

TABLE 3

| Ingredient | Specific Component | Comp. Ink A1 (wt % active) | Comp. Ink A2 (wt % active) | Comp. Ink A3 (wt % active) | Comp. Ink A4 (wt % active) | Comp. Ink A5 (wt % active) |
|---|---|---|---|---|---|---|
| Pigment dispersion | Comp. Disp-1 | 10 (wt % active of the pigment) | 0 | 0 | 0 | 0 |
| | Comp. Disp-2 | 0 | 10 (wt % active of the pigment) | 0 | 0 | 0 |
| | Comp. Disp-3 | 0 | 0 | 10 (wt % active of the pigment) | 0 | 0 |
| | Comp. Disp-4 | 0 | 0 | 0 | 10 (wt % active of the pigment) | 0 |
| | Comp. Disp-5 | 0 | 0 | 0 | 0 | 10 (wt % active of the pigment) |
| Binder | Polyester polyurethane | 10 | 10 | 10 | 10 | 10 |
| Co-solvent | 1,3-propanediol | 12 | 12 | 12 | 12 | 12 |
| | Tripropylene glycol methyl ether | 1 | 1 | 1 | 1 | 1 |
| Anti-decel agent | LIPONIC ® EG-1 | 2 | 2 | 2 | 2 | 2 |
| Surfactant | SURFYNOL ® 440 | 0.3 | 0.3 | 0.3 | 0.3 | 0.3 |
| Antimicrobial agent | ACTICIDE ® B20 | 0.04 | 0.04 | 0.04 | 0.04 | 0.04 |
| Water | Deionized water | Balance | Balance | Balance | Balance | Balance |

Comparative Inks A1-A5 do not include a rheology modifier.

Stability

The inks were tested for stability. Each example and comparative ink was stored in an accelerated storage (AS) or accelerated shelf life (ASL) environment at a temperature of 60° C. for one week. The particle size and the pH for each example and comparative ink were measured before and after the inks were stored in the ASL environment. The particle size was measured in terms of the volume-weighted mean diameter (Mv) and the D95 (i.e., 95% the population is below this value) using dynamic light scattering with a NANOTRAC® WAVE™ particle size analyzer (available from MICROTRAC™—NIKKISO GROUP™). The particle size and pH for each example and comparative ink before and after one week in the ASL environment are shown in Table 4.

TABLE 4

| | Ambient (pre ASL) | | | Post ASL | | |
|---|---|---|---|---|---|---|
| INK ID | Viscosity (cP) | Particle Size (Mv, μm) | pH | Viscosity (cP) | Particle Size (Mv, μm) | pH |
| Ex. Ink A1 | 3.7 | 0.301 | 8.54 | 3.3 | 0.323 | 8.17 |
| Ex. Ink A2 | 3.9 | 0.333 | 8.52 | 3.8 | 0.354 | 7.89 |
| Ex. Ink A3 | 4.4 | 0.407 | 8.52 | 4.3 | 0.374 | 8.02 |
| Comp. Ink A1 | 3.5 | 0.262 | 8.51 | 3.2 | 0.256 | 8.37 |
| Comp. Ink A2 | 3.8 | 0.326 | 8.26 | 3.8 | 0.350 | 7.78 |
| Comp. Ink A3 | 3.7 | 0.332 | 8.50 | 3.3 | 0.330 | 7.89 |
| Comp. Ink A4 | 3.2 | 0.280 | 8.53 | 3.3 | 0.290 | 8.45 |
| Comp. Ink A5 | 3.4 | 0.536 | 8.54 | 3.0 | 0.792 | 8.55 |

The results in Table 4 indicate that Example Inks A1-A3 and Comparative Inks A1-A4 are stable after 1 week ASL. Comparative Ink A5 is not very stable because of particle size growth.

Pigment Re-Dispersibility

The example and comparative inks were tested for pigment re-dispersibility. 40 g of each of the well-mixed inks was placed into a 50 mL centrifugation tube. Prior to centrifugation, the UV-VIS absorbance of each example ink and the comparative ink was measured.

To induce pigment sedimentation, each example ink and the comparative ink was centrifuged at 1000 rpm for 2 hours and 25 minutes. The white pigment settled at the bottom of the centrifugation tubes.

Each example ink and the comparative ink was then exposed to a remixing cycle using a Grant Bio PRT-35 programmable mixer with the following settings: Orbital: 80 rpm for 2 seconds; Reciprocal: 45° for about 5 seconds; Vibro/Pulse: 5° for about 5 seconds; and Time: 1 minute.

The UV-VIS absorbance of each example ink and the comparative ink was measured again after 1 remixing cycle and after 3 remixing cycles. The % Abs was calculated using the following equation:

$$\% \text{ Abs recovered} = \frac{\text{Abs (after centrifugation \& remixing)}}{\text{Abs (before centrifugation)}} * 100$$

and the results are shown in Table 5.

TABLE 5

| INK ID | Pigment Re-dispersibility % Abs Recovery (after 1 remixing cycle) | Pigment Re-dispersibility % Abs Recovery (after 3 remixing cycles) |
|---|---|---|
| Ex. Ink A1 | 69 | 72 |
| Ex. Ink A2 | 73 | 74 |
| Ex. Ink A3 | 82 | 83 |
| Comp. Ink A1 | 41 | 44 |
| Comp. Ink A2 | 43 | 46 |
| Comp. Ink A3 | 42 | 44 |
| Comp. Ink A4 | 39 | N/D |
| Comp. Ink A5 | 21 | N/D |

Comp. Inks A1-A5, with a comparative pigment dispersant, had white pigment recovery ranging from 21% to 43% after 1 remixing cycle, and either not detectable, or 44% to 46% after 3 remixing cycles. In contrast, each of the Example inks A1-A3, with an example anionic copolymer dispersant, had 69% to 82% white pigment recovery after 1 remixing cycle, and 72% to 83% after 3 remixing cycles. These results indicate that the presence of the example anionic copolymer dispersant in the inks significantly improves pigment re-dispersibility as compared to inks including the comparative pigment dispersants.

Opacity and Washfastness

Example Inks A1-A3 and Comparative Inks A1-A3 were tested for opacity and washfastness. To test opacity and washfastness, examples prints 1-3 were generated using, respectively ex. inks A1-A3, and comparative prints 4-6 were generated using comp. inks A1-A3.

For the prints, Gildan black heavy (5000) cotton T-shirts were used as the textile fabric.

A fixer composition (Table 6) and each of the respective Example inks A1-A3 and Comparative inks A1-A3 were used to generate the prints. For each print (example and comparative), the fixer composition (total of 55 gsm) and the respective ink (total of 300 gsm) were inkjet printed (using an 11 ng thermal inkjet printhead and wet on wet printing) over 6 passes. The example and comparative prints were cured at 150° C. for 3 minutes in a clam shell hot press.

TABLE 6

| Ingredient | Specific Component | wt % active |
|---|---|---|
| Co-solvent | 2,2-dimethyl-1,3-propanediol | 4 |
| Cationic Polymer | POLYCUP ™ 7360A | 4 |
| Surfactant | SURFYNOL ® 440 | 0.3 |
| Anti-Kogation Agent | CRODAFOS ® O10A | 0.5 |
| Water | Deionized water | Balance |

The example prints and the control print were tested for opacity, in terms of L*, i.e., lightness, of the white print. The measurements were taken with an X-Rite color measurement instrument. After the initial L* measurements were taken, each example print was washed 5 times in a Whirlpool Washer (Model WTW5000DW) with warm water (at about 40° C.) and detergent. Each example print was allowed to air dry between each wash. Then, the L* value of each example was again measured. The results are shown in Table 7.

TABLE 7

| Print ID | Ink ID | L* Before Wash | L* After 5 Washes |
|---|---|---|---|
| Ex. Print 1 | Ex. Ink A1 | 93.2 | 92.6 |
| Ex. Print 2 | Ex. Ink A2 | 94.0 | 93.8 |
| Ex. Print 3 | Ex. Ink A3 | 93.6 | 92.7 |
| Comp. Print 4 | Comp. Ink A1 | 92.4 | 92.3 |
| Comp. Print 5 | Comp. Ink A2 | 93.6 | 93.4 |
| Comp. Print 6 | Comp. Ink A3 | 92.8 | 91.0 |

A greater L* value indicates a greater opacity of the white ink on the colored textile fabric. As depicted, the initial opacity of the example prints was similar to that of the comparative prints. All of the Example Prints 1-3 exhibited good washfastness, and the change in L* after 5 washes was 0.9 or less.

Jettability

Figure 5:
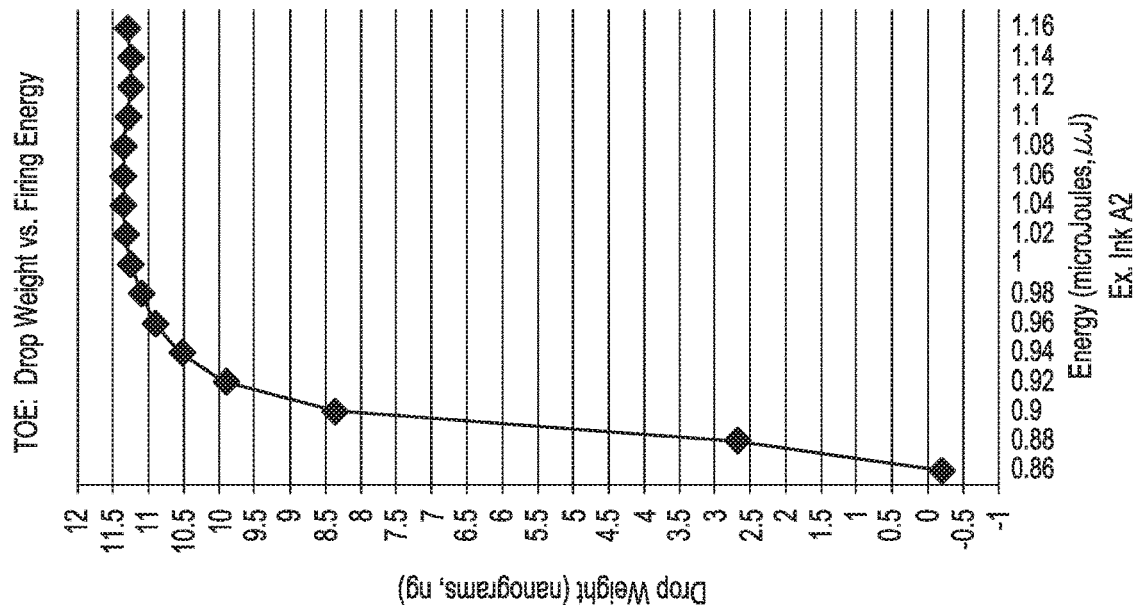
FIG. 5 is a turn on energy curve plotting drop weight in nanograms (ng) vs. firing energy in microJoules (µJ) for another example of the white inkjet ink disclosed herein.
Figure 4:
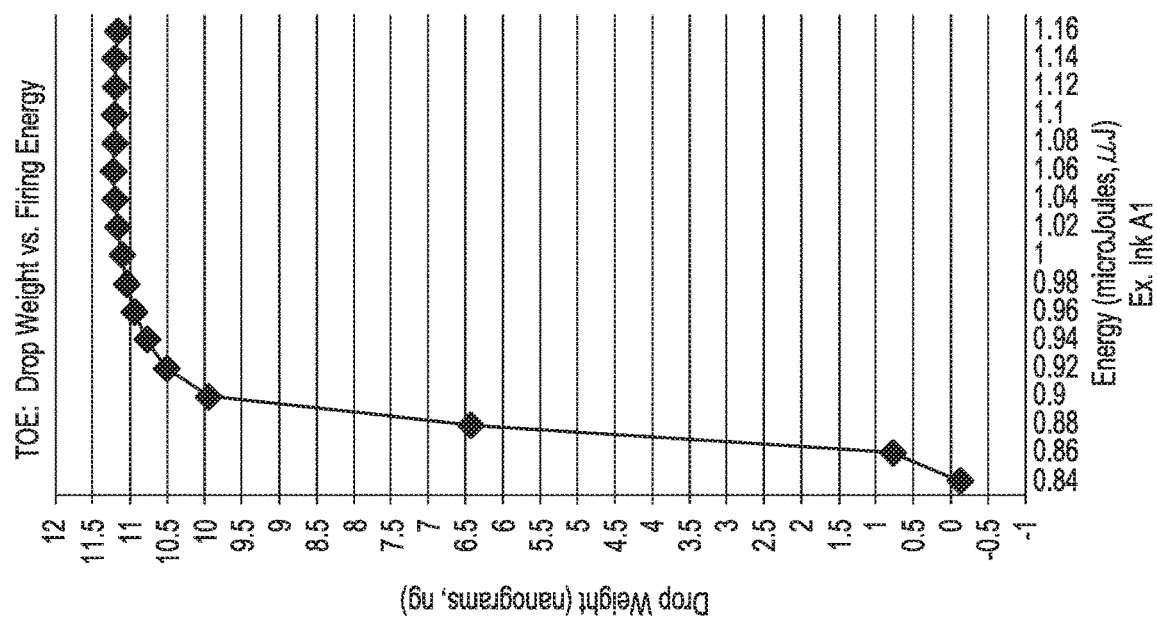
FIG. 4 is a turn on energy curve plotting drop weight in nanograms (ng) vs. firing energy in microJoules (µJ) for an example of the white inkjet ink disclosed herein.
Figure 6:
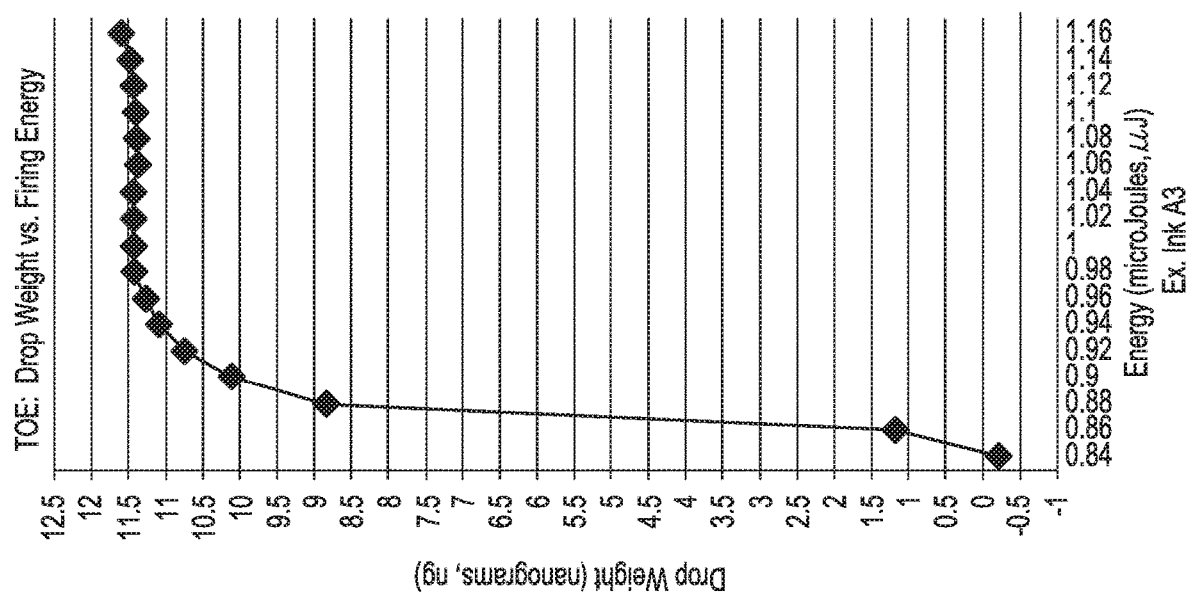
FIG. 6 is a turn on energy curve plotting drop weight in nanograms (ng) vs. firing energy in microJoules (µJ) for yet another example of the white inkjet ink disclosed herein.

A Turn-On Energy (TOE) curve was created for Example Inks A1-A3. The results are shown respectively in FIGS. 4-6. An inkjet ink with good jettability/pen performance also has a good TOE curve, where the ink drop weight rapidly increases (with increased firing energy) to reach a designed drop weight for the pen architecture used; and then a steady drop weight is maintained when the firing energy exceeds the TOE. As shown in FIGS. 4-6, each of Example Inks A1-A3 exhibited a sharp TOE curve, which indicates good jettability performance.

Figure 7:
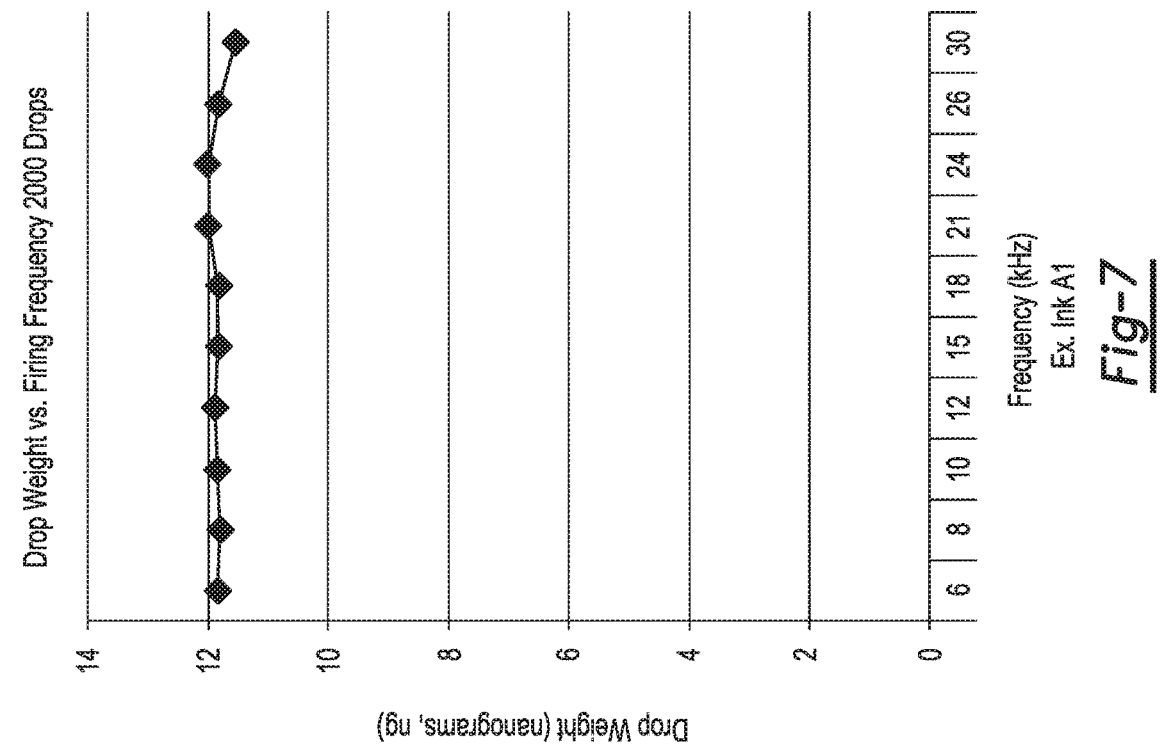
FIG. 7 is a graph plotting drop weight in nanograms (ng) vs. firing frequency in kiloHertz (kHz) for an example of the white inkjet ink disclosed herein.
Figure 9:
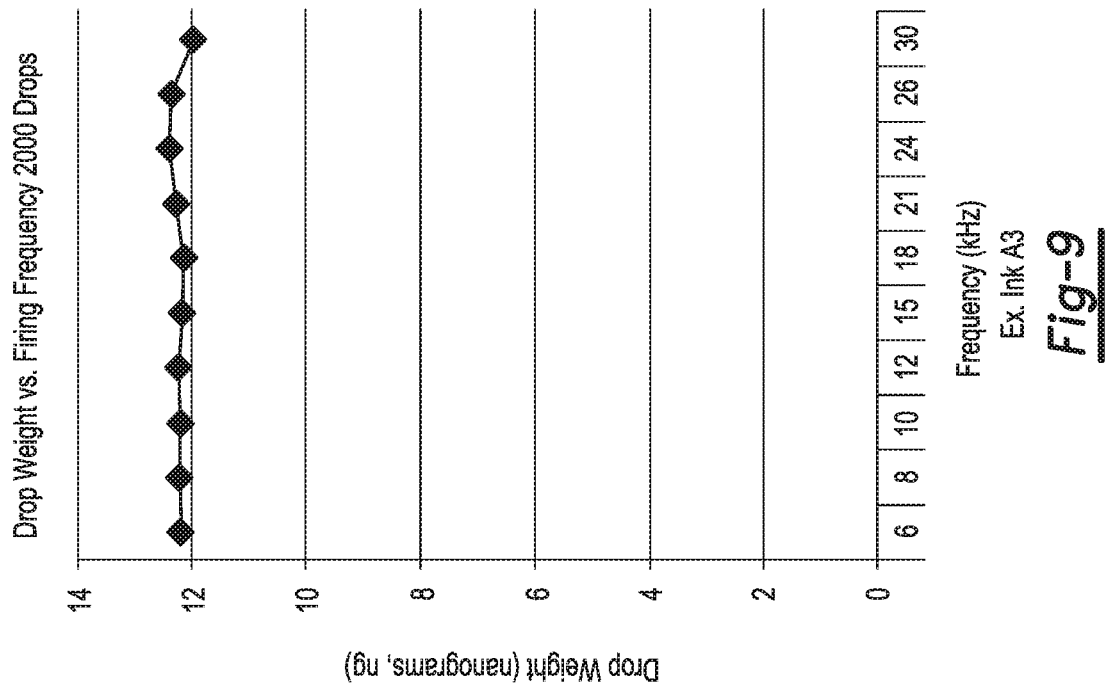
FIG. 9 is a graph plotting drop weight in nanograms (ng) vs. firing frequency in kiloHertz (kHz) for yet another example of the white inkjet ink disclosed herein.
Figure 8:
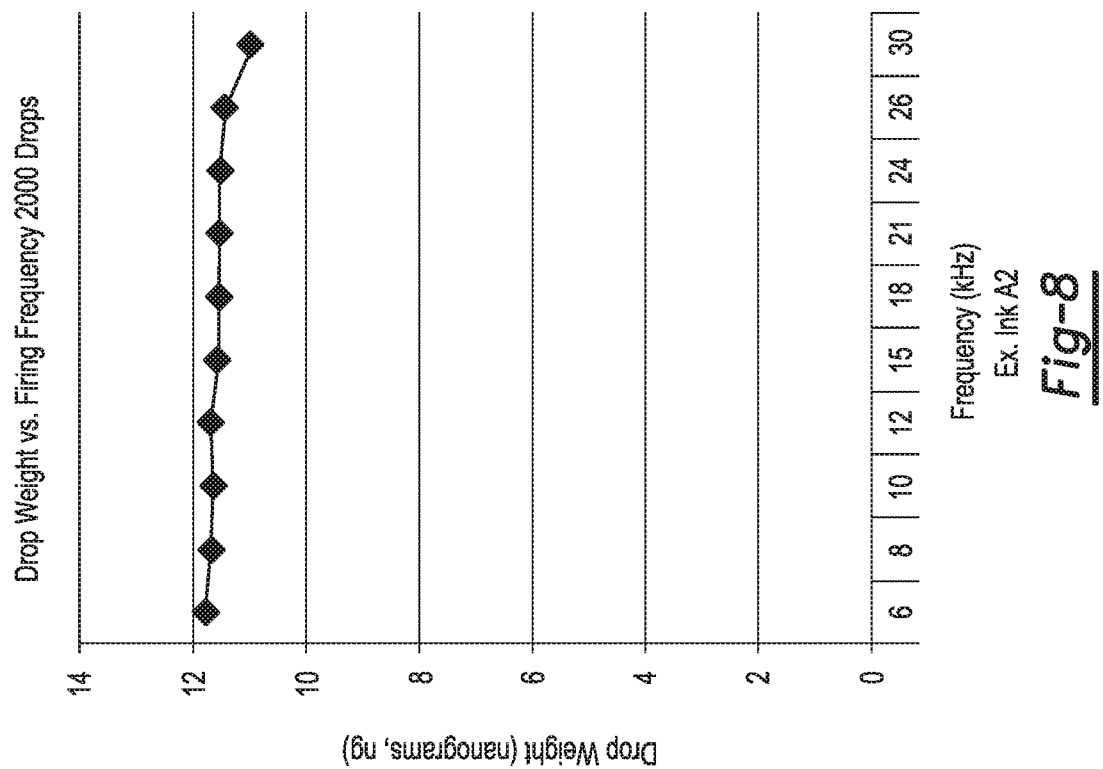
FIG. 8 is a graph plotting drop weight in nanograms (ng) vs. firing frequency in kiloHertz (kHz) for another example of the white inkjet ink disclosed herein.

A Drop weight frequency response curve was also created for Example Inks A1-A3. The results are shown respectively in FIGS. 7-9. The drop weight values (ng) are along the Y axis, and the firing frequency values (kHz) are along the X axis. As shown in FIGS. 7-9, each of Example Inks A1-A3 exhibited a good frequency response, which also indicates good jettability performance.

Example 2

Example inks K1-K3 and Comparative inks K1-K3 were prepared. These inks included an acrylic latex binder, instead of the polyester polyurethane binder that was included in the examples/comparative examples above.

Each of the inks had the same formulation except for the type of pigment and the pigment dispersant that was used. The general formulation of the example and comparative inks is shown in Table 8 and Table 9, with the wt % active of each component that was used (e.g., wt % active white pigment, not total amount of white dispersion). A 5 wt % potassium hydroxide aqueous solution was added to each of the inks until a pH of about 8.0 to 8.5 was achieved. The formulations of the Example and Comparative white dispersions are found in Table 1 above.

TABLE 8

| Ingredient | Specific Component | Example Ink K1 (wt % active) | Example Ink K2 (wt % active) | Example Ink K3 (wt % active) |
| --- | --- | --- | --- | --- |
| Pigment dispersion | Exp. Disp-1 | 10 (wt % active of the pigment) | 0 | 0 |
| | Exp. Disp-2 | 0 | 10 (wt % active of the pigment) | 0 |
| | Exp. Disp-3 | 0 | 0 | 10 (wt % active of the pigment) |
| Binder | Acrylic Latex | 9.7 | 9.7 | 9.7 |
| Co-solvent | 1,2-butanediol | 14.3 | 14.3 | 14.3 |
| | 2-pyrrolidone | 2.75 | 2.75 | 2.75 |
| | Tripropylene glycol methyl ether | 1.8 | 1.8 | 1.8 |
| | Tripropylene glycol n-butyl ether | 0.3 | 0.3 | 0.3 |
| Surfactant | TERGITOL ® 15-S-7 | 0.37 | 0.37 | 0.37 |
| | CAPSTONE ® FS-35 | 0.26 | 0.26 | 0.26 |
| Antimicrobial agent | ACTICIDE ® B20 | 0.02 | 0.02 | 0.02 |
| Water | Deionized water | Balance | Balance | Balance |

Example Inks K1-K3 do not include a rheology modifier.

TABLE 9

| Ingredient | Specific Component | Comp. Ink K1 (wt % active) | Comp. Ink K2 (wt % active) | Comp. Ink K3 (wt % active) |
| --- | --- | --- | --- | --- |
| Pigment dispersion | Comp. Disp-1 | 10 (wt % active of the pigment) | 0 | 0 |
| | Comp. Disp-2 | 0 | 10 (wt % active of the pigment) | 0 |
| | Comp. Disp-3 | 0 | 0 | 10 (wt % active of the pigment) |
| Binder | Acrylic Latex | 9.7 | 9.7 | 9.7 |
| Co-solvent | 1,2-butanediol | 14.3 | 14.3 | 14.3 |
| | 2-pyrrolidone | 2.75 | 2.75 | 2.75 |
| | Tripropylene glycol methyl ether | 1.8 | 1.8 | 1.8 |
| | Tripropylene glycol n-butyl ether | 0.3 | 0.3 | 0.3 |
| Surfactant | TERGITOL ® 15-S-7 | 0.37 | 0.37 | 0.37 |
| | CAPSTONE ® FS-35 | 0.26 | 0.26 | 0.26 |
| Antimicrobial agent | ACTICIDE ® B20 | 0.02 | 0.02 | 0.02 |
| Water | Deionized water | Balance | Balance | Balance |

Comparative Inks K1-K3 do not include a rheology modifier.

Example inks K1-K3 and Comparative inks K1-K3 were tested for pigment re-dispersibility. To reiterate from Example 1, 40 g of each of the well-mixed inks was placed into a 50 mL centrifugation tube. Prior to centrifugation, the UV-VIS absorbance of each example and comparative ink was measured.

To induce pigment sedimentation, each of the example and comparative inks was centrifuged at 1000 rpm for 2 hours and 25 minutes. The white pigment settled at the bottom of the centrifugation tubes.

Each of the example and comparative inks was then exposed to a remixing cycle using a Grant Bio PRT-35 programmable mixer with the following settings: Orbital: 80 rpm for 2 seconds; Reciprocal: 45° for about 5 seconds; Vibro/Pulse: 5° for about 5 seconds; and Time: 1 minute.

The UV-VIS absorbance of each example and comparative ink was measured again after 3 of the remixing cycles. The % Abs was calculated using the equation shown in Example 1, and the results are shown in Table 10.

TABLE 10

| INK ID | Pigment Re-dispersibility % Abs Recovery |
| --- | --- |
| Ex. Ink K1 | 80 |
| Ex. Ink K2 | 81 |
| Ex. Ink K3 | 88 |
| Comp. Ink K1 | 57 |
| Comp. Ink K2 | 66 |
| Comp. Ink K3 | 57 |

It can be seen that the Example inks K1-K3 (including an example anionic copolymer dispersant) exhibited significantly better pigment re-dispersibility than did Comparative inks K1-K3 (including a comparative pigment dispersant). These results illustrate that the desirable effect of the anionic copolymer dispersant on pigment re-dispersibility can be achieved with a different polymeric binder and ink vehicle.

It is to be understood that the ranges provided herein include the stated range and any value or sub-range within the stated range, as if the value(s) or sub-range(s) within the stated range were explicitly recited. For example, a range from about 1 wt % active to about 10 wt % active, should be interpreted to include not only the explicitly recited limits of from about 1 wt % active to about 10 wt % active, but also to include individual values, such as about 1.15 wt % active, about 2.5 wt % active, 4.0 wt % active, 6.77 wt % active, 8.85 wt % active, 9.33 wt % active, etc., and sub-ranges, such as from about 2 wt % active to about 5.65 wt % active, from about 3 wt % active to about 7 wt % active, from about 4.35 wt % active to about 8.95 wt % active, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A white inkjet ink, comprising:
   a non-self-dispersed white pigment;
   from about 0.005 wt % active to about 1 wt % active, based on a total weight of the white inkjet ink, of an anionic copolymer dispersant having a weight average molecular weight (Mw) ranging from about 125,000 g/mol to about 30,000,000 g/mol;
   a polymeric binder; and
   an aqueous vehicle.

2. The white inkjet ink as defined in claim 1 wherein the anionic copolymer dispersant is formed from: i) a backbone forming monomer selected from the group consisting of acrylic acid, methacrylic acid, and combinations thereof; and ii) a side chain forming monomer selected from the group consisting of polyethyleneglycol methacrylate methyl ether, polyethyleneglycol methacrylate ethyl ether, and combinations thereof.

3. The white inkjet ink as defined in claim 2 wherein the anionic copolymer dispersant is a copolymer of methacrylic acid and polyethyleneglycol methacrylate methyl ether (MeO-PEG-MA).

4. The white inkjet ink as defined in claim 1 wherein the anionic copolymer dispersant is a sole pigment dispersant in the white inkjet ink.

5. The white inkjet ink as defined in claim 1 wherein:
   the polymeric binder is a polyurethane-based binder selected from the group consisting of a polyester-polyurethane binder, a polyether-polyurethane binder, a polycarbonate-polyurethane binder, and combinations thereof; or
   the polymeric binder is an acrylic latex binder.

6. The white inkjet ink as defined in claim 5 wherein the white inkjet ink consists of the non-self-dispersed white pigment; the anionic copolymer dispersant; the polyurethane-based binder; the aqueous vehicle; and an additive selected from the group consisting of an anti-decel agent, a surfactant, an anti-microbial agent, and combinations thereof.

7. The white inkjet ink as defined in claim 1, further comprising an additive selected from the group consisting of an anti-decel agent, a surfactant, an anti-microbial agent, and combinations thereof.

8. The white inkjet ink as defined in claim 1 wherein each of the non-self-dispersed white pigment and the polymeric binder is present in a respective amount ranging from about 2 wt % active to about 20 wt % active, based on the total weight of the white inkjet ink.

9. A textile printing kit, comprising:
   a fixer composition, including:
      a cationic polymer; and
      an aqueous fixer vehicle; and
   a white inkjet ink, comprising:
      a non-self-dispersed white pigment;
      from about 0.005 wt % active to about 1 wt % active, based on a total weight of the white inkjet ink, of an anionic copolymer dispersant having a weight average molecular weight (Mw) ranging from about 125,000 g/mol to about 30,000,000 g/mol;
a polymeric binder; and
an aqueous vehicle.

10. The textile printing kit as defined in claim 9, further comprising a textile fabric selected from the group consisting of polyester fabrics, polyester blend fabrics, cotton fabrics, cotton blend fabrics, nylon fabrics, nylon blend fabrics, silk fabrics, silk blend fabrics, wool fabrics, wool blend fabrics, and combinations thereof.

11. The textile printing kit as defined in claim 9 wherein the anionic copolymer dispersant is a sole pigment dispersant in the white inkjet ink, and is a copolymer of methacrylic acid and polyethyleneglycol methacrylate methyl ether (MeO-PEG-MA).

12. The textile printing kit as defined in claim 9 wherein the cationic polymer of the fixer composition is selected from the group consisting of poly(diallyldimethylammonium chloride); poly(methylene-co-guanidine) anion, wherein the anion is selected from the group consisting of hydrochloride, bromide, nitrate, sulfate, and sulfonates; a polyamine; poly(dimethylamine-co-epichlorohydrin); a polyethylenimine; a polyamide epichlorohydrin resin; a polyamine epichlorohydrin resin; and a combination thereof.

13. A printing method, comprising:
generating a print by:
applying a fixer composition on a textile fabric to form a fixer composition layer, the fixer composition including:
a cationic polymer; and
an aqueous fixer vehicle; and
inkjet printing a white inkjet ink on the fixer composition layer to form an ink layer, the white inkjet ink including:
a non-self-dispersed white pigment;
from about 0.005 wt % active to about 1 wt % active, based on a total weight of the white inkjet ink, of an anionic copolymer dispersant having a weight average molecular weight (Mw) ranging from about 125,000 g/mol to about 30,000,000 g/mol;
a polymeric binder; and
an aqueous vehicle; and
thermally curing the print.

14. The method as defined in claim 13, further comprising mixing the white inkjet ink prior to inkjet printing the white inkjet ink.

15. The method as defined in claim 14, further comprising applying the fixer composition by inkjet printing.

* * * * *